| (12) | United States Patent | (10) Patent No.: | US 10,495,276 B2 |
|---|---|---|---|
| | Nakao et al. | (45) Date of Patent: | Dec. 3, 2019 |

(54) VEHICLE LIGHT SOURCE UNIT

(71) Applicant: Mitsubishi Electric Corporation, Chiyoda-ku, Tokyo (JP)

(72) Inventors: Takayuki Nakao, Tokyo (JP); Naoki Sawai, Tokyo (JP); Yuri Toda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 216 days.

(21) Appl. No.: 15/575,161

(22) PCT Filed: Jun. 1, 2016

(86) PCT No.: PCT/JP2016/066120
§ 371 (c)(1),
(2) Date: Nov. 17, 2017

(87) PCT Pub. No.: WO2016/203945
PCT Pub. Date: Dec. 22, 2016

(65) Prior Publication Data
US 2018/0142854 A1    May 24, 2018

(30) Foreign Application Priority Data

Jun. 15, 2015  (JP) ................. 2015-119944

(51) Int. Cl.
*F21S 41/19* (2018.01)
*F21V 19/02* (2006.01)
(Continued)

(52) U.S. Cl.
CPC .......... *F21S 41/192* (2018.01); *B60Q 1/0683* (2013.01); *F21S 41/143* (2018.01);
(Continued)

(58) Field of Classification Search
CPC ...... F21S 41/192; F21S 41/29; B60Q 1/0441; B60Q 1/0683; F21V 19/02; F21V 17/12; F21V 15/02; F21V 14/02
See application file for complete search history.

(56) References Cited

U.S. PATENT DOCUMENTS

| 5,735,596 A | * | 4/1998 | Daumueller | ......... B60Q 1/0466 |
| | | | | 362/267 |
| 6,250,787 B1 | * | 6/2001 | Matubara | ............... F21S 41/29 |
| | | | | 362/520 |

(Continued)

FOREIGN PATENT DOCUMENTS

| JP | 06-092179 A | 4/1994 |
| JP | 9-32816 A | 2/1997 |

(Continued)

OTHER PUBLICATIONS

International Search Report (PCT/ISA/210) dated Sep. 6, 2016, by the Japanese Patent Office as the International Searching Authority for International Application No. PCT/JP2016/066120.

(Continued)

*Primary Examiner* — Karabi Guharay
(74) *Attorney, Agent, or Firm* — Buchanan Ingersoll & Rooney PC

(57) ABSTRACT

A vehicle light source unit includes an optical supporting portion that supports the optical portion, a metal-made supporting portion, a fixing portion that fixes the metal-made supporting portion and the optical supporting portion in a partial and mutual manner, and a sliding portion that slidably supports the metal-made supporting portion and the optical supporting portion in a partial and mutual manner; the sliding portion is configured in such a way that the metal-made supporting portion and the optical supporting portion can slide on each other in a sliding direction and in such a way as to not only support the optical supporting (Continued)

portion against the metal-made supporting portion but also support the metal-made supporting portion against the optical supporting portion, toward the both sides of a supporting direction that are perpendicular to the sliding direction.

19 Claims, 14 Drawing Sheets

(51) Int. Cl.

| | |
|---|---|
| *F21V 15/04* | (2006.01) |
| *B60Q 1/068* | (2006.01) |
| *F21S 41/143* | (2018.01) |
| *F21S 41/29* | (2018.01) |
| *F21S 41/255* | (2018.01) |
| *F21S 41/26* | (2018.01) |
| *F21S 41/657* | (2018.01) |
| *F21S 41/663* | (2018.01) |
| *F21S 45/49* | (2018.01) |
| *F21S 45/47* | (2018.01) |
| *F21V 29/503* | (2015.01) |
| *F21V 29/70* | (2015.01) |
| *F21V 17/12* | (2006.01) |
| *F21Y 105/16* | (2016.01) |
| *F21Y 115/10* | (2016.01) |
| *F21W 102/13* | (2018.01) |

(52) U.S. Cl.
CPC ............. *F21S 41/19* (2018.01); *F21S 41/255* (2018.01); *F21S 41/26* (2018.01); *F21S 41/29* (2018.01); *F21S 41/295* (2018.01); *F21S 41/657* (2018.01); *F21S 41/663* (2018.01); *F21S 45/47* (2018.01); *F21S 45/49* (2018.01); *F21V 15/04* (2013.01); *F21V 17/12* (2013.01); *F21V 19/02* (2013.01); *F21V 29/503* (2015.01); *F21V 29/70* (2015.01); *F21W 2102/13* (2018.01); *F21Y 2105/16* (2016.08); *F21Y 2115/10* (2016.08)

(56) References Cited

U.S. PATENT DOCUMENTS

| | | | |
|---|---|---|---|
| 2002/0122312 A1* | 9/2002 | Berne | ............... F21S 41/29 |
| | | | 362/546 |
| 2004/0202007 A1 | 10/2004 | Yagi et al. | |
| 2015/0285470 A1 | 10/2015 | Hatanaka et al. | |

FOREIGN PATENT DOCUMENTS

| | | |
|---|---|---|
| JP | 2004-311224 A | 11/2004 |
| JP | 2005-338488 A | 12/2005 |
| JP | 2009-42633 A | 2/2009 |
| JP | 2013-171777 A | 9/2013 |
| JP | 2014-107229 A | 6/2014 |
| JP | 3196241 U | 2/2015 |

OTHER PUBLICATIONS

Office Action (Notification of Reasons for Refusal) dated Apr. 17, 2018, by the Japanese Patent Office in corresponding Japanese Patent Application No. 2017-524792 and English translation of the Office Action. (11 pages).

* cited by examiner

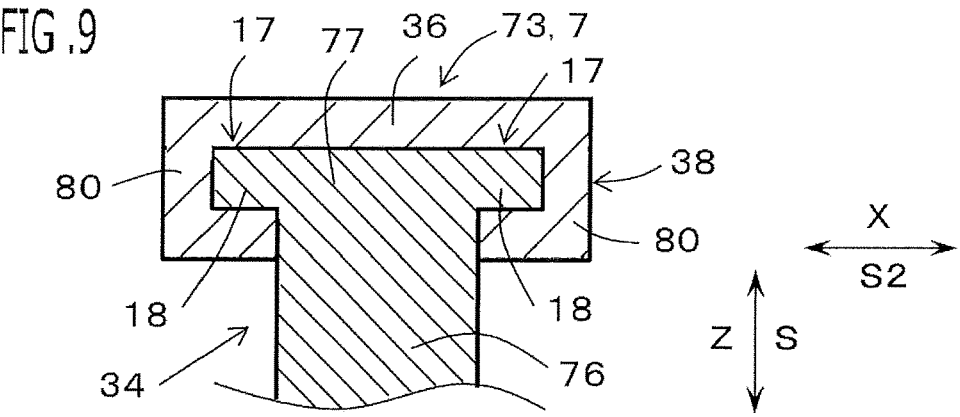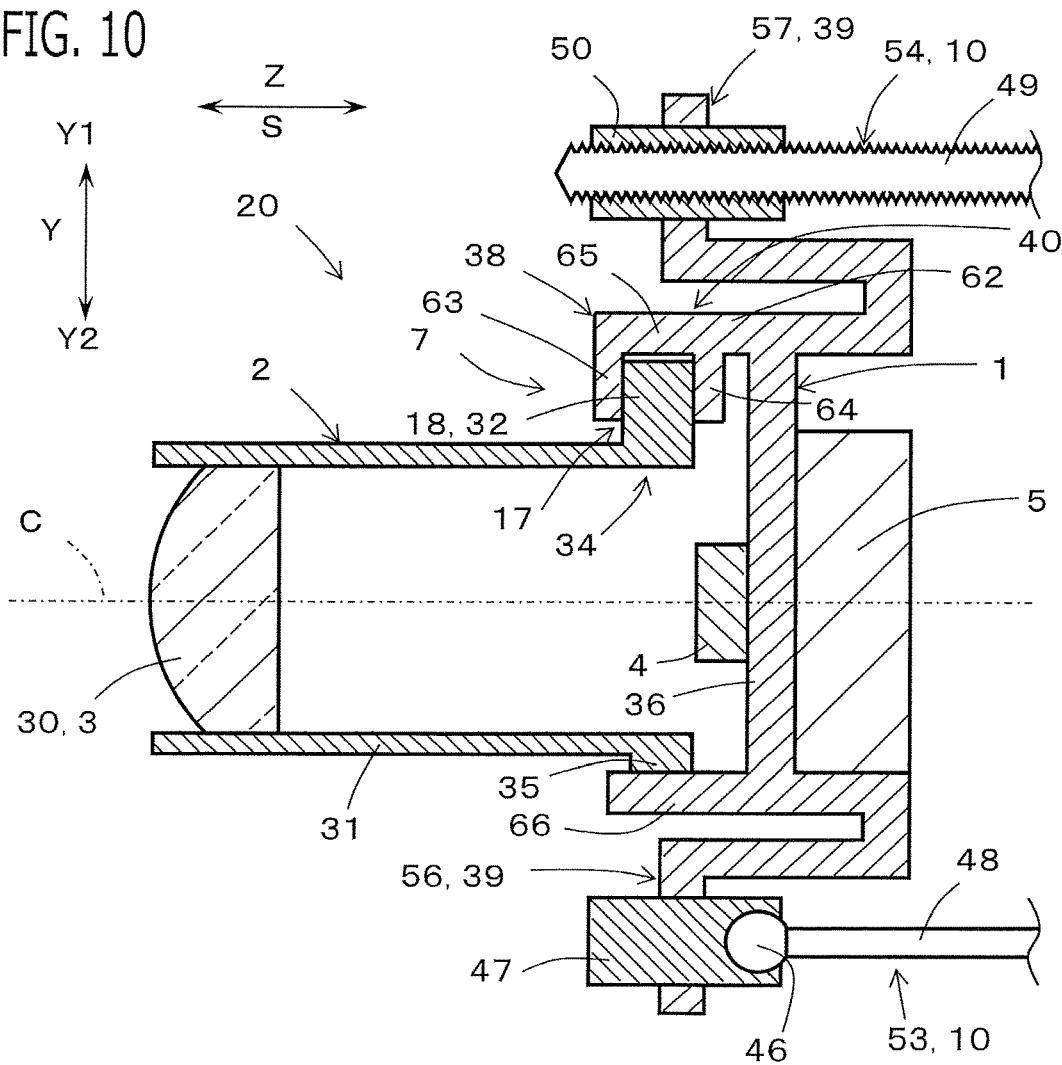

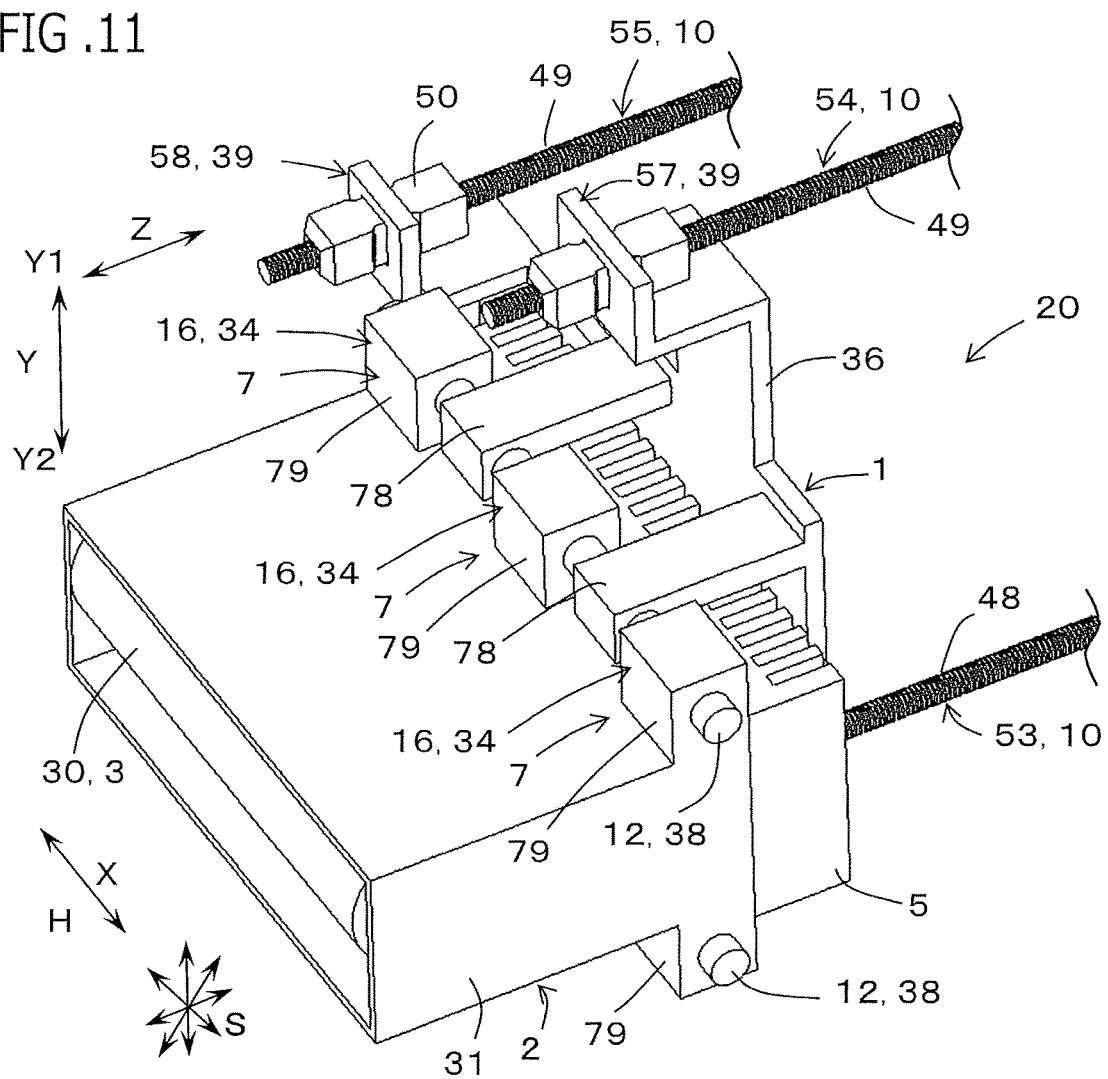

VEHICLE LIGHT SOURCE UNIT

TECHNICAL FIELD

The present invention relates to a vehicle light source unit in which a light-emitting portion and an optical portion thereof are supported by a supporting portion.

BACKGROUND ART

With regard to such a vehicle light source unit as described above, a vehicle light source unit disclosed in PLT 1, described below, is known. In the technology disclosed in PLT 1, a light emitting diode as the light-emitting portion and a projection lens as the optical portion are supported by a metal-made light source supporting block and a plurality of light source supporting blocks are supported by a common, metal-made supporting member. Accordingly, in the technology disclosed in PLT 1, heat generated by each of the light emitting diodes is transferred to the metal-made supporting member through the intermediary of the light source supporting block that is formed of metal and has a high heat conductivity, so that temperature rising in the light emitting diode is suppressed.

CITATION LIST

Patent Literature

PLT 1: JP-A-2004-311224

SUMMARY OF INVENTION

Technical Problem

However, in the technology disclosed in PLT 1, in order to improve the heat conductivity, for example, the bottom end face of the light source supporting block is fixed to the metal-made supporting member (paragraph 0043 in PLT 1). Therefore, in the technology disclosed in PLT 1, when due to external force or a change with temperature, one or both of the light source supporting block and the metal-made supporting member are deformed, the deformation of the one thereof is transferred to the other one thereof and hence a deformation such as a warp may be caused in the other one thereof, or the deformation of the one thereof is restrained by the other one thereof, thereby causing a stress, and hence a deformation such as a warp may be caused in the one thereof. When a deformation such as a warp is caused, the optical axis of the optical portion may deviate. In particular, when one or both of the light source supporting block and the metal-made supporting member are lightened, they become liable to be deformed and hence the optical axis of the optical portion becomes liable to deviate.

The present invention has been implemented in order to solve the foregoing problems; the objective thereof is to provide a vehicle light source unit that can suppress the optical axis of the optical portion from deviating, even when due to external force or a change with temperature, one of or both of the optical supporting portion and the metal-made supporting portion are deformed.

Solution to Problem

A vehicle light source unit according to the present invention includes a light-emitting portion, an optical portion that guides light from the light-emitting portion, an optical supporting portion that supports the optical portion, a metal-made supporting portion, a fixing portion that fixes the metal-made supporting portion and the optical supporting portion in a partial and mutual manner, and a sliding portion that slidably supports the metal-made supporting portion and the optical supporting portion in a partial and mutual manner; the sliding portion is configured in such a way that the metal-made supporting portion and the optical supporting portion can slide on each other in a predetermined sliding direction and in such a way as to not only support the optical supporting portion against the metal-made supporting portion but also support the metal-made supporting portion against the optical supporting portion, toward one and the other sides of a predetermined supporting direction that is perpendicular to the sliding direction.

Advantage of Invention

In the vehicle light source unit according to the present invention, even when one of or both of the metal-made supporting portion and the optical supporting portion are deformed, the sliding portions slides in the predetermined sliding direction; thus, the relative deformation in the sliding direction can be prevented. Thus, it can be suppressed that due to restraint of the deformation, a stress is caused and hence a deformation such as a warp is caused, and it can also be suppressed that a deformation, in the sliding direction, of one of the metal-made supporting portion and optical supporting portion cause a deformation of the other one thereof. Moreover, through the intermediary of the sliding portion, the metal-made supporting portion and the optical supporting portion support each other toward one and the other side in the supporting direction perpendicular to the sliding direction; thus, it is made possible to suppress deformations such as warps from being caused in the metal-made supporting portion and the optical supporting portion. As a result, it is made possible to suppress the optical axis of the optical portion from deviating, even when due to external force or a change with temperature, one of or both of the optical supporting portion and the metal-made supporting portion are deformed.

BRIEF DESCRIPTION OF THE DRAWINGS

FIG. 9 is a cross-sectional view of principal parts in the vehicle light source unit according to Embodiment 2 of the present invention;

FIG. 10 is a cross-sectional view of a vehicle light source unit according to Embodiment 3 of the present invention;

FIG. 11 is a perspective view of a vehicle light source unit according to Embodiment 4 of the present invention;

DESCRIPTION OF EMBODIMENTS

1. Embodiment 1

Figure 1:
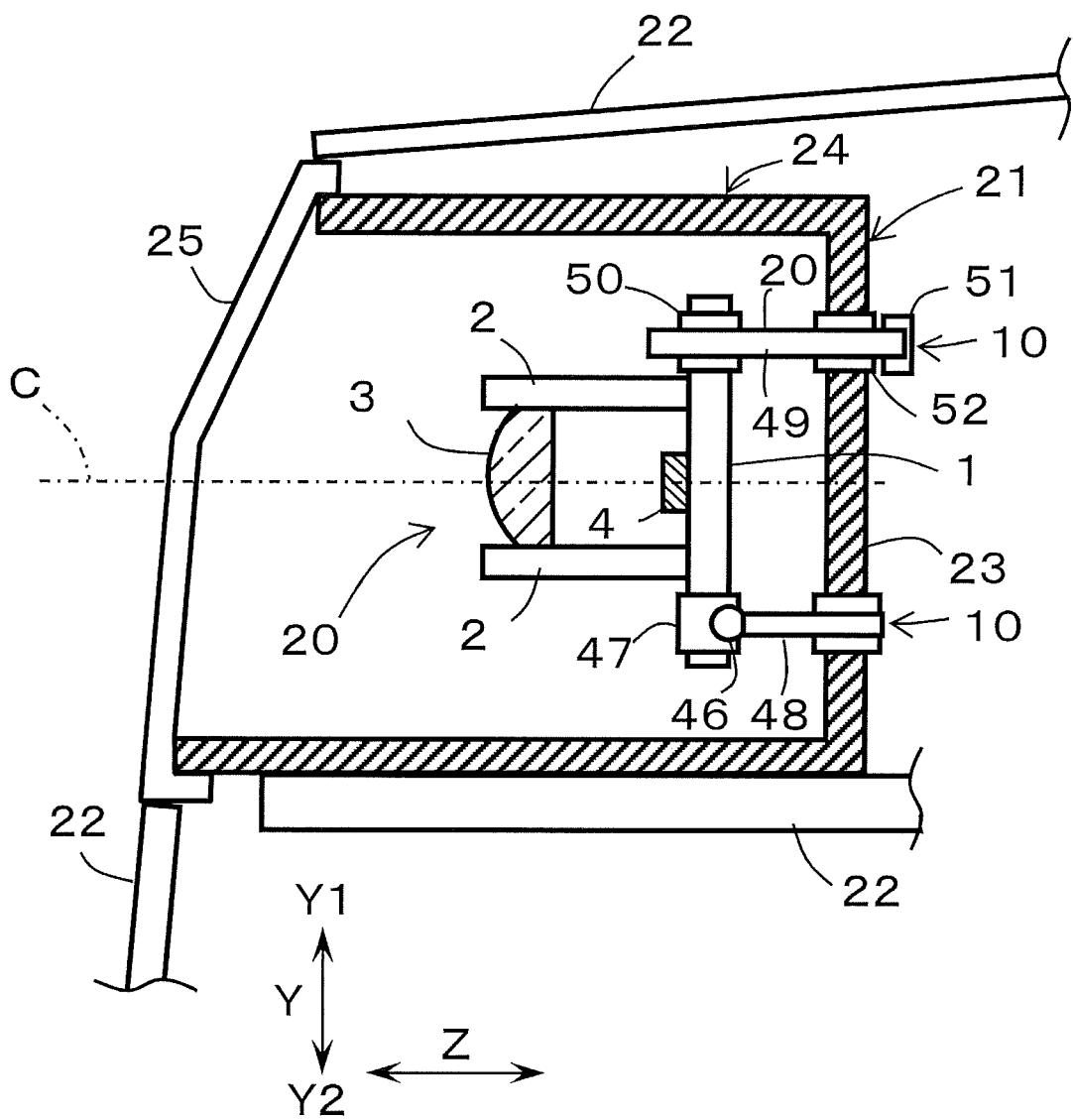
FIG. 1 is a schematic cross-sectional view at a time when a vehicle light source unit according to Embodiment 1 of the present invention is integrated into a vehicle lamp.
Figure 2:
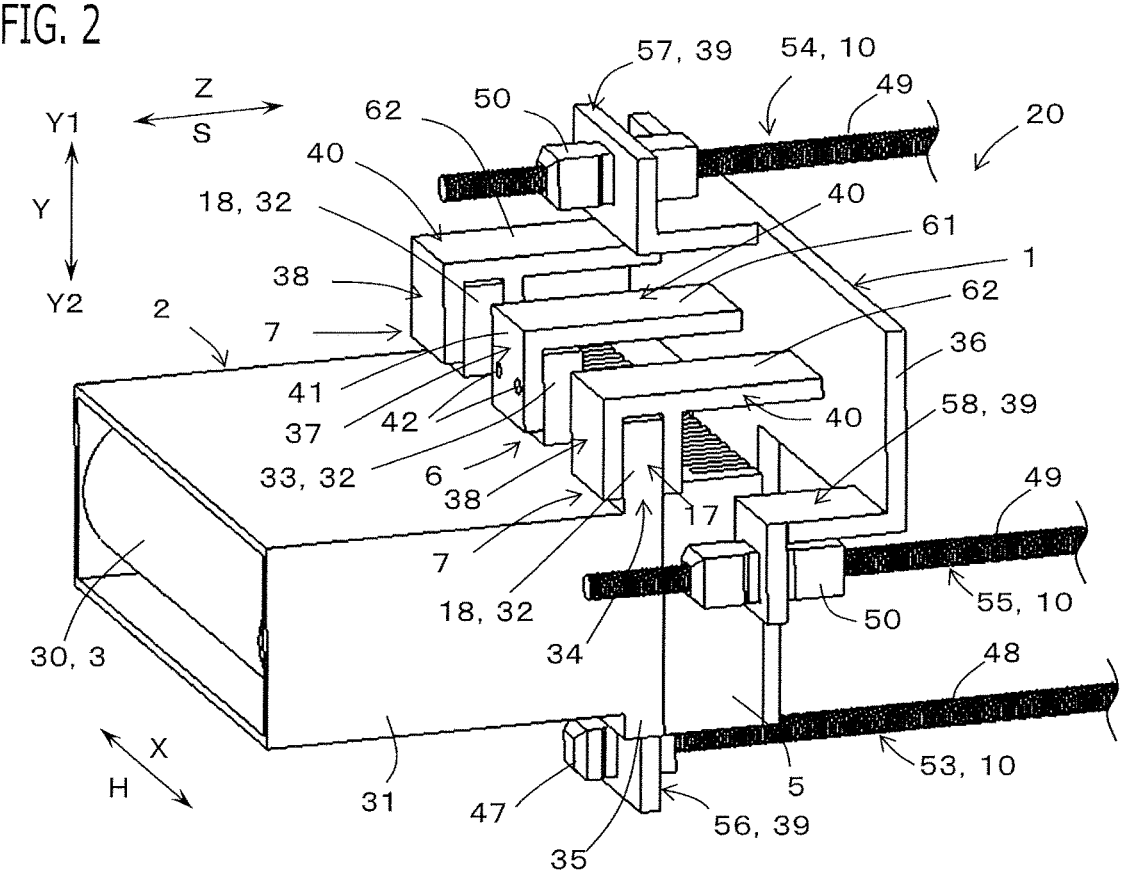
FIG. 2 is a perspective view of the vehicle light source unit according to Embodiment 1 of the present invention.
Figure 3:
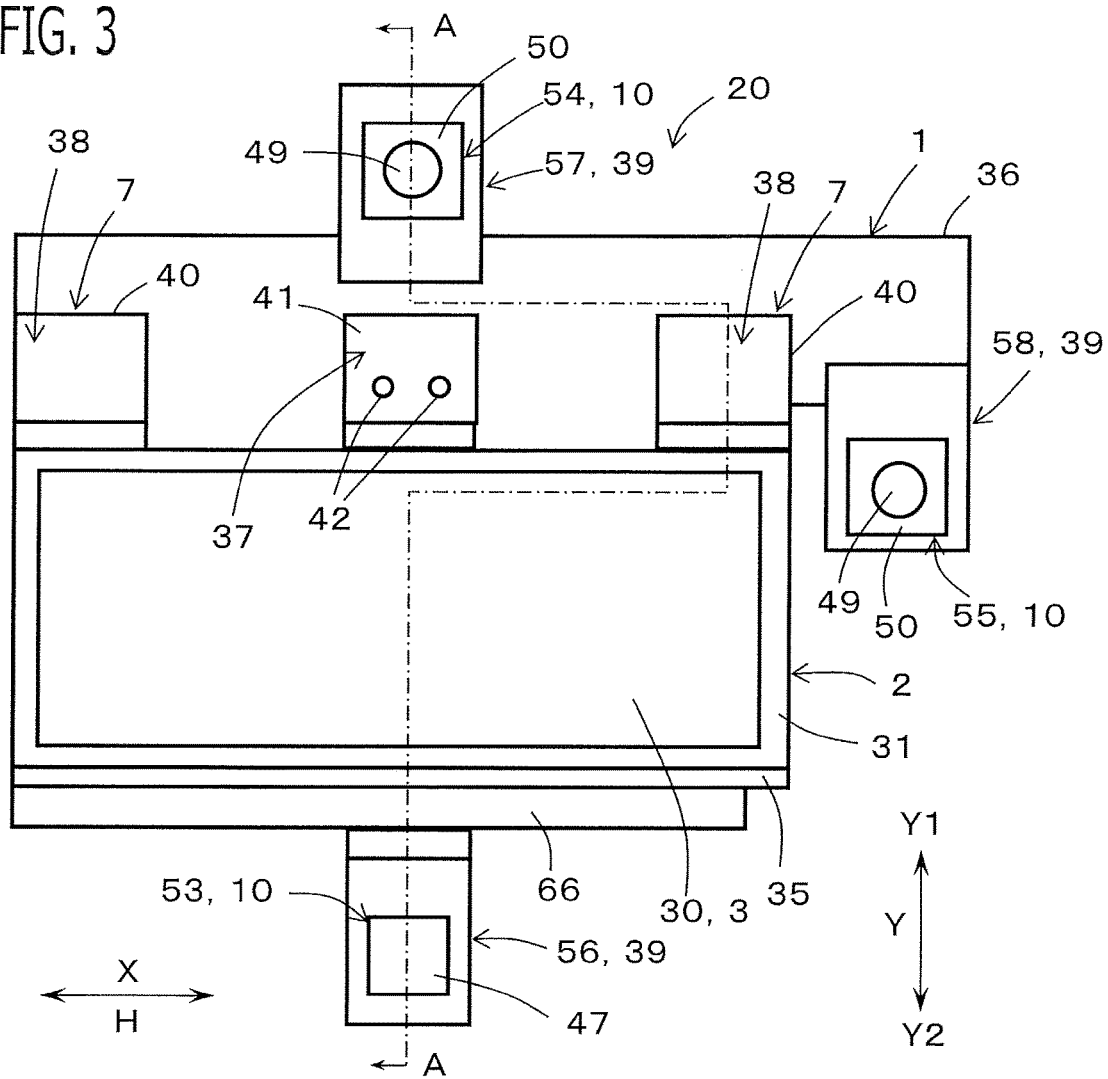
FIG. 3 is an elevation view of the vehicle light source unit according to Embodiment 1 of the present invention.
Figure 4:
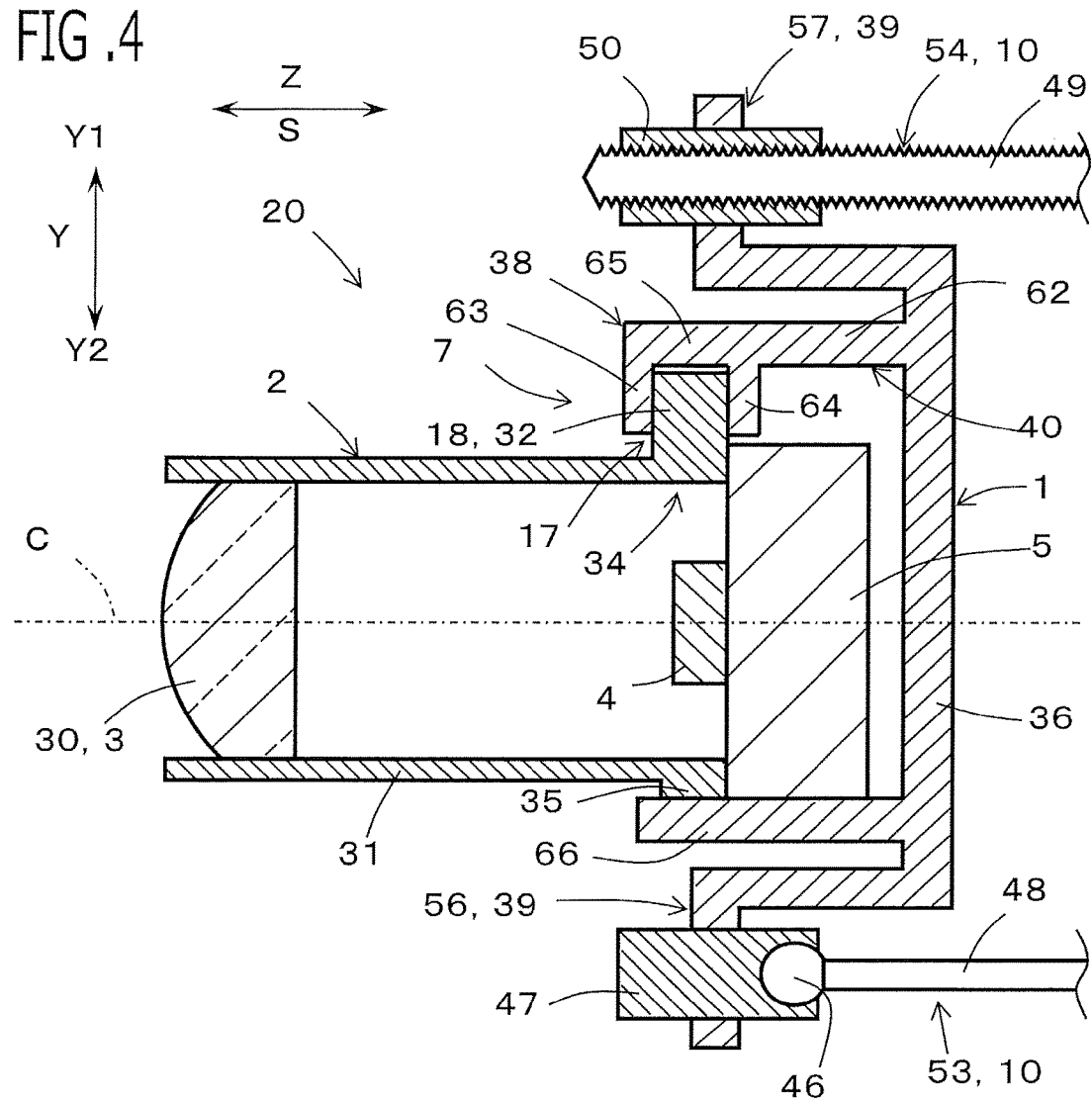
FIG. 4 is a cross-sectional view of the vehicle light source unit according to Embodiment 1 of the present invention.

A vehicle light source unit 20 (hereinafter, referred to simply as a light source unit 20) according to Embodiment 1 will be explained with reference to drawings. FIG. 1 is a schematic cross-sectional view at a time when a light source unit 20 is integrated into a lamp 21 (a head light, in this example) fixed in a vehicle 22; FIG. 2 is a perspective view of the light source unit 20 according to Embodiment 1, when viewed from a position diagonally ahead of the vehicle; FIG. 3 is an elevation view of the light source unit 20, when viewed from a position ahead of the vehicle in the optical axis direction Z; FIG. 4 is a cross-sectional view at a time when the light source unit 20 is cut along a bent plane, at the A-A cross-sectional position in FIG. 3, that is parallel to the optical axis direction Z and a second perpendicular direction Y.

The light source unit 20 is provided with a light-emitting portion 4 and an optical portion 3 that guides the light from the light-emitting portion 4. The light source unit 20 is provided with an optical supporting portion 2 that supports the optical portion 3, a metal-made supporting portion 1, a fixing portion 6 that fixes the metal-made supporting portion 1 and the optical supporting portion 2 in a partial and mutual manner, and sliding portions 7 that each slidably support the metal-made supporting portion 1 and the optical supporting portion 2 in a partial and mutual manner. In addition, the sliding portion 7 is configured in such a way that the metal-made supporting portion 1 and the optical supporting portion 2 can slide on each other in a predetermined sliding direction H and in such a way as to not only support the optical supporting portion 2 against the metal-made supporting portion 1 but also support the metal-made supporting portion 1 against the optical supporting portion 2, toward one and the other sides of a predetermined supporting direction S that are perpendicular to the sliding direction H.

In the present application, the direction that is parallel to the optical axis C of the optical portion 3 will be referred to as "the optical axis direction Z"; the light irradiation direction side, in the optical axis direction Z, of the light source unit 20 will be referred to as "forward" or "the forward side"; the side opposite to the light irradiation direction side of the light source unit 20 will be referred to as "backward" or "the backward side". The predetermined straight line direction that is perpendicular to the optical axis direction Z will be referred to as "a first perpendicular direction X"; the direction that is perpendicular to the optical axis direction Z and the first perpendicular direction X will be referred to as "a second perpendicular direction Y". "Upward", "downward", and "horizontal" denote the upward, the downward, and the horizon, respectively, in the vertical direction under the condition that the light source unit 20 is mounted in the vehicle 22. In Embodiment 1, the first perpendicular direction X is parallel to the horizontal direction and the second perpendicular direction Y is parallel to the vertical direction under the condition that the light source unit 20 is mounted in the vehicle 22.

In the present application, "substantially parallel" denotes within the range of ±10°, i.e., the range from −10° to +10°. In addition, "substantially perpendicular" denotes within the range of 90°±10°, i.e., the range from 80° to 100°.

1-1. The Schematic Configuration of the Light Source Unit 20

The light source unit 20 is a unit in which the light-emitting portion 4 and the optical portion 3 are supported by a supporting portion including the optical supporting portion 2, the metal-made supporting portion 1, and the like. As illustrated in FIG. 1, the light source unit 20 is integrated into the vehicle lamp 21 that is fixed in the vehicle 22 such as a 4-wheel or 2-wheel automobile and illuminates the surroundings of the vehicle 22, such as the forward side and the backward side of the vehicle 22. The lamp 21 is provided with a hollow lamp body 24 that forms a wall for surrounding the circumference thereof and whose front side is opened and a translucent transparent cover 25 that covers the opening portion of the lamp body 24. The light source unit 20 is disposed in the lamp room surrounded by the lamp body 24 and the transparent cover 25. It may be allowed that a plurality of light source units 20 are provided in the lamp 21.

The lamp body 24 is fixed to the vehicle 22 by use of an unillustrated fixation member so as to be positioned with respect to the vehicle 22. The lamp body 24 has a base portion 23 with which the light source unit 20 is coupled. In the example illustrated in FIG. 1, the base portion 23 is the rear wall portion of the lamp body 24. The metal-made supporting portion 1 is coupled with the base portion 23 by coupling portions 10, so that the light source unit 20 is positioned with respect to the base portion 23.

In Embodiment 1, the lamp 21 is a head light for the vehicle. The coupling portion 10 is the angle-variable coupling portion 10 that can adjust the angle of mounting the metal-made supporting portion 1 in the base portion 23 of the lamp 21. Accordingly, the angle, with respect to the vehicle 22, of the optical axis C of the light source unit 20 can be adjusted by the angle-variable coupling portion 10. The configuration of the angle-variable coupling portion 10 will be described later.

The light-emitting portion 4 is provided with a light-emitting component that emits light when supplied with electric power. In Embodiment 1, as the light-emitting portion 4, a light emitting diode is utilized. The light-emitting portion 4 is configured with one or more chips, of light emitting diodes, that are fixed on a heat-conductive board. As the light-emitting component, a laser diode, a HID (high intensity discharged) lamp, a halogen lamp, or the like may be utilized.

The optical portion 3 includes one or more optical components such as a lens, a reflector, and a prism, which refract or reflect light so as to guide the light emitted by the light-emitting portion 4. In Embodiment 1, the optical portion 3 is formed of a lens 30; in this example, the lens 30 is a planoconvex cylindrical lens whose front face is cylindrical tubular and whose rear face is planar. The lens 30 is elongated in a direction along which the cylindrical tubular face extends. The first perpendicular direction X is parallel to the direction along which the cylindrical tubular face extends. The lens 30 is elongated in the direction along which the cylindrical tubular face extends; the longitudinal direction of the lens 30 is parallel to the first perpendicular direction X. It may be allowed that the optical portion 3 is formed of two or more lenses.

The optical axis C of the optical portion 3 denotes a virtual light ray representing light beams that pass through the whole optical system. In the case where both the front and rear faces of the lens are curved, the optical axis C is a straight line that passes through the curvature center of the front face of the lens and the curvature center of the rear face of the lens; in the case where any one of the front and rear faces of the lens is curved and the other one thereof is planar, the optical axis C is a straight line that passes through the curvature center of the curved face and is perpendicular to the plane. In the case of a cylindrical lens, the optical axis C is a straight line that passes through the curvature center of an arc on a cross-sectional shape perpendicular to the direction along which the cylindrical tubular face related to the front face and the rear face extends, or a straight line that is perpendicular to the straight line.

The optical supporting portion 2 is a member for supporting the optical portion 3. In Embodiment 1, the optical supporting portion 2 is made of resin. As the resin, plastic or the like is utilized. Here, "being made of resin" includes the case where the major portion, which is the frame thereof, is formed of resin and a material, such as metal, other than resin is partially utilized.

Although the detail will be described later, the metal-made supporting portion 1 supports the optical supporting portion 2 through the intermediaries of the fixing portion 6 and the sliding portions 7. The optical supporting portion 2 includes an optical case portion 31 that supports the optical portion 3, an optical-side fixing portion 33 that is included in a portion, at the fixing portion 6, of the optical supporting portion 2, and an optical-side sliding portion 34 that is included in a portion, at the sliding portions 7, of the optical supporting portion 2. The optical case portion 31, the optical-side fixing portion 33, and the optical-side sliding portion 34 are coupled with one another so as to form an integrated member. In Embodiment 1, one optical-side fixing portion 33 and two optical-side sliding portions 34 are provided.

The optical case portion 31, which surrounds the lens 30, is formed in the shape of a tube that extends in the optical axis direction Z. The inner circumferential surface of the optical case portion 31 and the outer circumferential surface of the lens 30 are fit with each other and are fixed to each other by use of depression and protrusion portions, an adhesive, or the like. In accordance with the shape of the lens 30, which is a cylindrical lens, the optical case portion 31 is formed in such a way that the shape of its cross section perpendicular to the optical axis direction Z is a rectangular tube that is elongated in the longitudinal direction. The respective sides of the optical case portion 31 are parallel to the optical axis direction Z, the first perpendicular direction X, or the second perpendicular direction Y. The first perpendicular direction X is parallel to the longitudinal direction of the optical supporting portion 2.

In Embodiment 1, the light source unit 20 includes a heat radiation portion 5. The heat radiation portion 5 radiates heat generated by the light-emitting portion 4 to the outside. In Embodiment 1, the heat radiation portion 5 is a heat sink in which two or more rectangular tabular fins protrude from one surface of a rectangular-parallelepiped fin base portion. The heat radiation portion 5 is formed in such a way that the outer shape thereof is rectangular-parallelepiped; the surface, of the fin base portion, that is opposite to the surface from which the fins protrude covers the rear opening of the optical case portion 31. As the heat radiation portion 5, a high-heat-conductivity material, for example, ceramics or metal such as aluminum is utilized.

The optical supporting portion 2 supports also the heat radiation portion 5. In Embodiment 1, the heat radiation portion 5 is fixed to the rear side of the optical supporting portion 2 by use of a fixation member such as a screw, an adhesive, or the like. Describing in detail, the surface, of the fin base portion, that is opposite to the surface from which the fins protrude is fixed to the rear side of the optical case portion 31 in such a way as to cover the rear opening of the optical case portion 31. It is assumed that the optical supporting portion 2 is deformable, for example, expands or contracts, independent from the heat radiation portion 5.

In Embodiment 1, the light-emitting portion 4 is fixed to the heat radiation portion 5. Describing in detail, the light-emitting portion 4 is disposed inside the optical case portion 31 in such a way that the light irradiation direction thereof faces the forward side, and the rear side of the light-emitting portion 4 is fixed to the front surface by use of a fixation member such as a screw, an adhesive, or the like. A plurality of the light-emitting portions 4 are arranged in a row along the longitudinal direction of the lens 30 (the first perpendicular direction X, in this example) and are fixed to the heat radiation portion 5 (unillustrated).

The metal-made supporting portion 1 is a member made of metal. As the metal, for example, an aluminum alloy is utilized. Here, "being made of metal" includes the case where the major portion, which is the frame thereof, is formed of metal and a material, such as resin, other than metal is partially utilized.

Although the detail will be described later, the metal-made supporting portion 1 supports the optical supporting portion 2 through the intermediaries of the fixing portion 6 and the sliding portions 7. The metal-made supporting portion 1 is provided with a metal-made supporting main body portion 36, which is the frame thereof, a metal-side fixing portion 37 forming the portion, at the fixing portion 6, of the metal-made supporting portion 1, and a metal-side sliding portion 38 forming the portion, at the sliding portions 7, of the metal-made supporting portion 1. The metal-made supporting portion 1 is provided with a coupling support portion 39 with which the coupling portion 10 is coupled. The metal-made supporting main body portion 36, the metal-side fixing portion 37, the metal-side sliding portion 38, and the coupling support portion 39 are coupled with one another so as to form an integrated member. In Embodiment 1, one metal-side fixing portion 37, two metal-side sliding portions 38, and three coupling support portions 56, 57, and 58 are provided.

The metal-made supporting main body portion 36 is formed in such a way as to be spaced by a gap behind the optical supporting portion 2 (the heat radiation portion 5, in this example) and in such a way as to be in the shape of a plate expanding in a direction perpendicular to the optical axis direction Z. The coupling support portion 39 and the metal-made supporting main body portion 36 are integrally coupled with each other. In Embodiment 1, as described above, the metal-made supporting portion 1 is coupled with the base portion 23 by the angle-variable coupling portions 10 that each can adjust the mounting angle of the metal-made supporting portion 1 with respect to the base portion 23. The base portion 23 is disposed spaced by a gap behind the metal-made supporting portion 1. The angle-variable coupling portions 10 support at three points the metal-made supporting portion 1 against the base portion 23 by three movable coupling axles 53, 54, and 55. Because the metal-made supporting portion 1, which supports the weight of the light source unit 20 at three points, takes a load, it is made of metal having a large strength.

A first movable coupling axle 53 is a ball-pivot axle and has an axle 48 having a ball-shaped ball portion 46 at its front end and a ball bearing portion 47 that bears the ball portion 46. Sliding between the ball portion 46 and the ball bearing portion 47 makes it possible to change the angle of the axle 48 with respect to the ball bearing portion 47. In Embodiment 1, the ball bearing portion 47 is fixed to the coupling support portion 39 of the metal-made supporting portion 1; the ball portion 46 is fit into the ball bearing portion 47. The axle 48 extends backward from the ball portion 46; the rear end portion thereof is fixed to the base portion 23. Describing in detail, the ball bearing portion 47 is fixed to the front end portion of a first coupling support portion 56 extending forward from the lower end portion of the metal-made supporting main body portion 36; the axle 48 extends backward from the ball bearing portion 47.

Each of second and third movable coupling axles 54 and 55 is a feed-screw mechanism and is provided with a feed screw rod 49, a feed nut 50, a screw rotating portion 51 for rotating the feed screw rod 49, and a screw rod supporting portion 52 that pivotably supports the feed screw rod 49. The feed nut 50 is fixed to the metal-made supporting portion 1; the screw rod supporting portion 52 is fixed in the base portion 23; the feed screw rod 49 penetrates the base portion 23; the screw rotating portion 51 is disposed at the backward side of the base portion 23 (refer to FIG. 1). When through the screw rotating portion 51, the feed screw rod 49 is rotated clockwise or anticlockwise, the feed nut 50 travels in one or the other one of the axle directions of the feed screw rod 49, with respect to the base portion 23.

In Embodiment 1, the feed nut 50 for the second movable coupling axle 54 is fixed to the front end portion of the second coupling support portion 57 extending forward from the upper end portion of the metal-made supporting main body portion 36; the feed screw rod 49 extends backward from the feed nut 50. The feed nut 50 for the third movable coupling axle 55 is fixed to the front end portion of the third coupling support portion 58 extending forward from one end portion, in the first perpendicular direction X, of the metal-made supporting main body portion 36; the feed screw rod 49 extends backward from the feed nut 50. The screw rotating portion 51 is an engagement portion where a machine tool engages with the screw rotating portion 51, and is disposed at the backward side of the base portion 23. The second movable coupling axle 54 adjusts the angle of the optical axis C with respect to the base portion 23 to the second perpendicular direction Y; the third movable coupling axle 55 adjusts the angle of the optical axis C with respect to the base portion 23 to the first perpendicular direction X.

1-2. The Configurations of the Fixing Portion 6 and the Sliding Portion 7

The light source unit 20 is provided with the fixing portion 6 that fixes the metal-made supporting portion 1 and the optical supporting portion 2 in a partial and mutual manner and the sliding portions 7 that each slidably support the metal-made supporting portion 1 and the optical supporting portion 2 in a partial and mutual manner. The sliding portion 7 is configured in such a way that the metal-made supporting portion 1 and the optical supporting portion 2 can slide on each other in the predetermined sliding direction H and in such a way as to not only support the optical supporting portion 2 against the metal-made supporting portion 1 but also support the metal-made supporting portion 1 against the optical supporting portion 2, toward one and the other sides of the predetermined supporting direction S that is perpendicular to the sliding direction H. That is to say, the sliding portion 7 is configured in such a way that the metal-made supporting portion 1 and the optical supporting portion 2 support each other, toward one and the other sides of the supporting direction S.

According to this configuration, the supporting portion for supporting the light-emitting portion 4 and the optical portion 3 is formed of two supporting portions, i.e., the metal-made supporting portion 1 and the optical supporting portion 2, and the two supporting portions support each other through the fixing portion 6 and the sliding portions 7. The optical supporting portion 2 that supports at least the optical portion 3 is positioned with respect to the metal-made supporting portion 1 through the fixing portion 6, so that the optical axis C of the optical portion 3 can be fixed. When one of or both of the metal-made supporting portion 1 and the optical supporting portion 2 are lightened, for example, by being formed of resin or thinned-down metal, one of or both of the metal-made supporting portion 1 and the optical supporting portion 2 become liable to be deformed, due to external force or a change with temperature. For example, due to angle adjustment through the angle-variable coupling portion 10 or vibration of the vehicle, external force is transferred to the metal-made supporting portion 1 and hence one of or both of the metal-made supporting portion 1 and the optical supporting portion 2 are deformed; alternatively, a change with temperature makes one of or both of the metal-made supporting portion 1 and the optical supporting portion 2 expand or contract. Even when one of or both of the metal-made supporting portion 1 and the optical supporting portion 2 are deformed, the sliding portions 7 slides in the predetermined sliding direction H; thus, the relative deformation in the sliding direction H can be prevented. Thus, it can be suppressed that due to restraint of the deformation, a stress is caused and hence a deformation such as a warp is caused in one of or both of the metal-made supporting portion 1 and the optical supporting portion 2, and it can also be suppressed that a deformation, in the sliding direction H, of one of the metal-made supporting portion 1 and optical supporting portion 2 cause a deformation of the other one thereof.

Moreover, through the sliding portion 7, the metal-made supporting portion 1 and the optical supporting portion 2 support each other, toward one and the other sides of the supporting direction S that is perpendicular to the sliding direction H; therefore, a deformation such as a warp in the supporting direction S can be prevented from being caused in the metal-made supporting portion 1 and the optical supporting portion 2.

Even when one of or both of the metal-made supporting portion 1 and the optical supporting portion 2 are lightened, it can be suppressed that a change with temperature or external force causes a deformation such as a warp in the metal-made supporting portion 1 and the optical supporting portion 2, and it can be suppressed that deviation of the optical axis C is caused. That is to say, it is made possible that while one of or both of the metal-made supporting portion 1 and the optical supporting portion 2 are lightened, a change with temperature or external force is suppressed from causing the optical axis C to deviate.

In Embodiment 1, the optical supporting portion 2 is made of resin. Accordingly, in comparison with the case where as a conventional technology, the optical supporting portion 2 is made of metal, the light source unit 20 can considerably be lightened. In contrast, when the optical supporting portion 2 is made of resin, a change with temperature makes the light source unit 20 liable to expand or contract while its strength is deteriorated, in comparison with the case where as a conventional technology, the optical supporting portion 2 is made of metal. However, even when a change with temperature or external force deforms the optical supporting portion 2 made of resin, the sliding portion 7 can suppress a deformation such as a warp from being caused in the optical supporting portion 2, as described above; thus, deviation of the optical axis C can be suppressed from being caused. As a result, it is made possible that while the optical supporting portion 2 is made of resin so as to be lightened, a change with temperature or external force is suppressed from causing the optical axis C to deviate.

In Embodiment 1, the sliding direction H is substantially parallel (parallel, in this example) to the longitudinal direction of the optical supporting portion 2. The longitudinal direction of the optical supporting portion 2 denotes the longitudinal direction at a time when the optical supporting portion 2 is viewed in the optical axis direction Z. In this example, the longitudinal direction is perpendicular to the optical axis direction Z. The sliding direction H is a straight line direction.

The deformation amount, in the longitudinal direction, of the optical supporting portion 2 is liable to be larger than that in the transverse direction; the deformation in the longitudinal direction makes the optical supporting portion 2 liable to warp in a direction perpendicular to the longitudinal direction. The foregoing configuration makes it possible to prevent the deformation in the sliding direction H through the sliding of the sliding portions 7; thus, it can be suppressed that when the deformation in the sliding direction H is restrained, a stress is caused and hence a deformation such as a warp is caused in the optical supporting portion 2. Because the optical supporting portion 2 is supported against the metal-made supporting portion 1 toward one and the other sides of the supporting direction S perpendicular to the longitudinal direction, the warp in the optical supporting portion 2 can be suppressed. Accordingly, even when the optical supporting portion 2 deforms in the longitudinal direction, the warp in the optical supporting portion 2 can be suppressed; thus, it is made possible to slightly translate the optical axis C in the longitudinal direction. Accordingly, it is made possible to suppress the optical axis C from inclining and hence it is made possible to suppress the forward irradiation coverage of the light source unit 20 from fluctuating. That is to say, it is made possible to suppress the optical axis C from deviating.

The sliding direction H is substantially perpendicular (perpendicular, in this example) to the optical axis direction Z of the optical portion 3. This configuration makes it possible not only to deform the optical supporting portion 2 in the sliding direction H substantially perpendicular to the optical axis C but also to suppress the optical supporting portion 2 from warping toward one and the other sides of the supporting direction S perpendicular to the sliding direction H. Accordingly, even when the optical supporting portion 2 deforms, it is made possible to slightly translate the optical axis C in the sliding direction H substantially perpendicular to the optical axis C; thus, it is made possible to suppress the optical axis C from inclining.

The supporting direction S is substantially parallel (parallel, in this example) to the optical axis direction Z. Accordingly, it is made possible to suppress the optical supporting portion 2 from warping in the optical axis direction Z and hence it is made possible to suppress the optical axis C from inclining.

The sliding portions 7 are disposed at end portions of the optical supporting portion 2. This configuration makes it possible that up to the end portion of the optical supporting portion 2, the sliding portion 7 suppresses the optical supporting portion 2 from warping. The suppression effect for the deviation of the optical axis C can be raised.

There are provided one fixing portion 6 and two or more (two, in this example) sliding portions 7. In this configuration, by providing two or more sliding portions 7, the suppression effect for deformations in the optical supporting portion 2 and the metal-made supporting portion 1 can be raised. Provided that unlike Embodiment 1, two or more fixing portions 6 are provided spaced from each other and the portion, between the two fixing portions 6, of the optical supporting portion 2 are deformed due to expansion or the like, the foregoing portion of the optical supporting portion 2 may unexpectedly deform, for example, may warp because the both ends of the foregoing portion are restrained by the two fixing portions 6. Thus, only one fixing portion 6 is provided, so that it is made possible to prevent such a deformation from being caused.

In Embodiment 1, the sliding portions 7 are arranged at the both end portions of the optical supporting portion 2 interposing the fixing portion 6. It is made possible to suppress a whole warp between the both end portions of the optical supporting portion 2 by arranging the sliding portions 7 at the both end portions of the optical supporting portion 2.

The sliding portions 7 are arranged at the both end portions, in the longitudinal direction, of the optical supporting portion 2. A warp in each of the both longitudinal-direction end portions of the optical supporting portion 2 is liable to be larger than a warp in each of the both transverse-direction end portions thereof. The foregoing configuration can effectively suppress a warp in the optical supporting portion 2.

The fixing portion 6 is disposed at the center portion, in the longitudinal direction, of the optical supporting portion 2. This configuration makes it possible to position and fix the optical supporting portion 2 in a balanced manner at the center portion in the longitudinal direction. Then, the sliding portions 7 can suppress a warp, in the optical supporting portion 2, that increases as the position on the optical supporting portion 2 departs from the fixing portion 6 toward either one of the both end portions in the longitudinal-direction.

The fixing portion 6 is disposed at the center of the end portion of one side Y1 (the upper side, in this example), in the second perpendicular direction, of the optical supporting portion 2; the sliding portions 7 are arranged at the both longitudinal-direction ends of the end portion of the one side Y1 (the upper side, in this example), in the second perpendicular direction, of the optical supporting portion 2.

In Embodiment 1, the sliding portion 7 has a sliding groove portion 17 that is groove-shaped and provided at any one of the metal-made supporting portion 1 and the optical supporting portion 2 (at the metal-made supporting portion 1, in this example) and a sliding protrusion portion 18 that is protrusion-shaped, provided at the other one of the metal-made supporting portion 1 and the optical supporting portion 2 (at the optical supporting portion 2, in this example), and slidably inserted into the sliding groove portion 17. The sliding direction H is the direction along which the sliding groove portion 17 extends; the supporting direction S is the transverse direction of the sliding groove portion 17. This configuration makes it possible that by slidably inserting the sliding protrusion portion 18 into the sliding groove portion 17, the sliding portions 7 is appropriately formed.

In Embodiment 1, the cross-sectional shape of the sliding groove portion 17 is a rectangular groove, and the cross-sectional shape of the sliding protrusion portion 18 is a rectangular protrusion. The sliding groove portion 17 extends in a straight manner. The two opposite planar side faces (the both side faces, in the transverse direction, of the groove) of the sliding groove portion 17 are sliding surfaces. The two planar side faces, of the sliding protrusion portion 18, that face the two respective side faces of the sliding groove portion 17 are sliding surfaces. The direction (normal direction) that is perpendicular to the sliding surfaces of the sliding groove portion 17 and the sliding protrusion portion 18 is the supporting direction S. One of the sliding surfaces of the sliding groove portion 17 supports one of the sliding surfaces of the sliding protrusion portion 18, which faces the one of the sliding surfaces, toward the other side of the supporting directions S; the other one of the sliding surfaces of the sliding groove portion 17 supports the other one of the sliding surfaces of the sliding protrusion portion 18, which faces the other one of the sliding surfaces, toward the one side of the supporting directions S. Accordingly, by means of the two opposite sliding surfaces, the sliding groove portion 17 supports the sliding protrusion portion 18 toward one and the other sides of the supporting direction S.

The metal-side sliding portion 38 has a sliding surface that extends in the sliding direction H and faces toward one side of the supporting direction S and a sliding surface that faces toward the other side of the supporting direction S. The optical-side sliding portion 34 has two sliding surfaces that face the respective sliding surfaces of the metal-side sliding portion 38. In Embodiment 1, the two opposite side faces of the sliding groove portion 17 are the sliding surfaces, of the metal-side sliding portion 38, that face toward the one side of the supporting direction S and the other side of the supporting direction S, respectively. The two side faces, of the sliding protrusion portion 18, that face the two respective side faces of the sliding groove portion 17 are sliding surfaces of the optical-side sliding portion 34.

In Embodiment 1, the extending direction and the sliding surface of each of the sliding groove portion 17 and the sliding protrusion portion 18 are substantially parallel (parallel, in this example) to the longitudinal direction; the sliding direction H is substantially parallel (parallel, in this example) to the longitudinal direction. The extending direction and the sliding surface of each of the sliding groove portion 17 and the sliding protrusion portion 18 are substantially perpendicular (perpendicular, in this example) to the optical axis direction Z; the sliding direction H is substantially perpendicular (perpendicular, in this example) to the optical axis direction Z. The normal direction of the sliding surface (side face) of each of the sliding groove portion 17 and the sliding protrusion portion 18 are substantially parallel (parallel, in this example) to the optical axis direction Z; the supporting direction S is substantially parallel (parallel, in this example) to the optical axis direction Z.

The optical supporting portion 2 has two or more protruding portions 32 that protrude at the outer circumference side of the optical case portion 31. Each of these protruding portions 32 forms the optical-side sliding portion 34 (the sliding protrusion portion 18, in this example) or the optical-side fixing portion 33. In Embodiment 1, three protruding portions 32 are provided; the respective protruding portions 32 protrude toward one side Y1 (upper side) of the second perpendicular direction from the center portion and the both end portions, in the longitudinal direction, at the rear end portion, of the optical case portion 31, that is at the one side Y1 (upper side, in this example) of the second perpendicular direction. The three protruding portions 32 are arranged in a row along the longitudinal direction and in such a way as to be spaced from one another. The protruding portion 32 at the center in the longitudinal direction forms the optical-side fixing portion 33; the two protruding portions 32 at the both ends in the longitudinal direction each form the sliding protrusion portion 18. The two sliding protrusion portions 18 are arranged one by one at both sides in the longitudinal direction of the optical-side fixing portion 33.

Each of the two sliding protrusion portions 18 is formed in the shape of a rectangular parallelepiped having sides parallel to the optical axis direction Z or the longitudinal direction. Accordingly, each of the two sliding protrusion portions 18 has the front face and the rear face that are perpendicular to the optical axis direction Z; the front face and the rear face are the sliding surfaces that each slide on the metal-side sliding portion 38 (two groove side wall portions 63 and 64, described later).

The sliding portion 7 has a gap in the direction that intersects the sliding direction H, and is slidable by a distance corresponding to the gap in a direction along which the gap is provided. In Embodiment 1, a gap in the second perpendicular direction Y is provided between the metal-side sliding portion 38 (a bottom wall portion 65, described later) and the face, at the one side Y1 (the upper side) of the second perpendicular direction Y, of each of the two sliding protrusion portions 18. In the second perpendicular direction Y that is perpendicular to the sliding direction H and the optical axis direction Z, the sliding portion 7 is slidable by a distance corresponding to the gap in the second perpendicular direction Y. Accordingly, it is made possible to prevent a deformation in the optical supporting portion 2 from being caused in the second perpendicular direction Y, which is a direction other than the sliding direction H; thus, it is made possible to suppress a deformation such as a warp from being caused in the optical supporting portion 2, due to occurrence of a stress.

As is the case with the sliding protrusion portion 18, the optical-side fixing portion 33 is formed in the shape of a rectangular parallelepiped. The front face of the optical-side fixing portion 33 is an abutting face that abuts on the metal-side fixing portion 37.

In Embodiment 1, in addition to the respective front and rear faces of the two sliding protrusion portion 18, the optical supporting portion 2 has a sliding surface that slides on the metal-made supporting portion 1. The optical supporting portion 2 has an opposite-side protruding portion 35 that is situated at the other side Y2 (the lower side, in this example), in the second perpendicular direction, of the optical case portion 31 and protrudes from the rear end portion of the optical case portion 31 toward the other side Y2 (the lower side) in the second perpendicular direction. The opposite-side protruding portion 35 is formed in the shape of a rectangular parallelepiped that has sides parallel to the optical axis direction Z and the longitudinal direction and is elongated in the longitudinal direction. The face, at the other side Y2 (the lower side) in the second perpendicular direction, of the opposite-side protruding portion 35 is a face parallel to the optical axis direction Z and the longitudinal direction and is a sliding surface (referred to as a the-other-side sliding surface, hereinafter) that slides on the metal-made supporting portion 1. Thus, the metal-made supporting portion 1 slidably supports the optical supporting portion 2 from the lower side, through the intermediary of the the-other-side sliding surface.

The metal-made supporting portion 1 has two or more extending portions 40 that protrude forward from the metal-made supporting main body portion 36. These extending portions 40 form the metal-side sliding portions 38 and the metal-side fixing portion 37. In Embodiment 1, three extending portions 40 are provided and protrude forward from the metal-made supporting main body portion 36. The three extending portions 40 are arranged in a row along the longitudinal direction and in such a way as to be spaced from one another. The extending portion 40 at the center in the longitudinal direction forms the metal-side fixing portion 37; the two extending portions 40 at the both sides in the longitudinal direction each form the metal-side sliding portion 38.

The metal-side fixing portion 37 (the extending portion 40) has a fixing end portion 41 that extends toward the other side Y2 (the lower side) in the second perpendicular direction from the front end portion of a rectangular tabular portion 61 that extends forward. The rear face of the fixing end portion 41 abuts on the front face of the optical-side fixing portion 33; the fixing end portion 41 and the optical-side fixing portion 33 are fixed to each other by use of a fixation member such as a screw, an adhesive, or the like (two screws 42, in this example).

Each of the metal-side sliding portions 38 (the extending portions 40) has the sliding groove portion 17 at the front end portion of the rectangular tabular portion 62 that extends forward. The sliding groove portion 17 is a groove that opens toward the other side Y2 (the lower side) in the second perpendicular direction and extends in the longitudinal direction. The sliding groove portion 17 includes a rectangular tabular bottom wall portion 65 that forms the bottom of the groove, the two rectangular tabular groove side wall portions 63 and 64 that are spaced from each other in the forward and backward direction and each extend toward the other side Y2 (the lower side) in the second perpendicular direction from the bottom wall portion 65. The space surrounded by the bottom wall portion 65 and the groove side wall portions 63 and 64 is a groove in a rectangular parallelepiped shape. Each of the bottom wall portion 65 and the groove side wall portions 63 and 64 is formed in the shape of a rectangular plate having sides parallel to the optical axis direction Z or the longitudinal direction.

The front groove side wall portion 63 has a rear face perpendicular to the optical axis direction Z; the rear groove side wall portion 64 has a front face perpendicular to the optical axis direction Z; the rear face and the front face are the sliding surfaces that each slide on the optical-side sliding portion 34 (the sliding protrusion portion 18). A gap in the second perpendicular direction Y is provided between the metal-side sliding portion 38 (the sliding protrusion portion 18) and the face, at the other side Y2 (the lower side) in the second perpendicular direction, of the bottom wall portion 65.

The metal-made supporting portion 1 has a the-other-side extending portion 66 that is tabular and extends forward from the metal-made supporting main body portion 36. The the-other-side extending portion 66 is formed in the shape of a rectangular plate having sides parallel to the optical axis direction Z or the longitudinal direction. The face, at the one side Y1 (the upper side) in the second perpendicular direction, of the the-other-side extending portion 66 is a face parallel to the optical axis direction Z and the longitudinal direction and is a sliding surface that slides on the optical supporting portion 2 (the the-other-side sliding surface).

Thus, the metal-made supporting portion 1 slidably supports the optical supporting portion 2 from the lower side, through the intermediary of the the-other-side extending portion 66.

2. Embodiment 2

Figure 5:
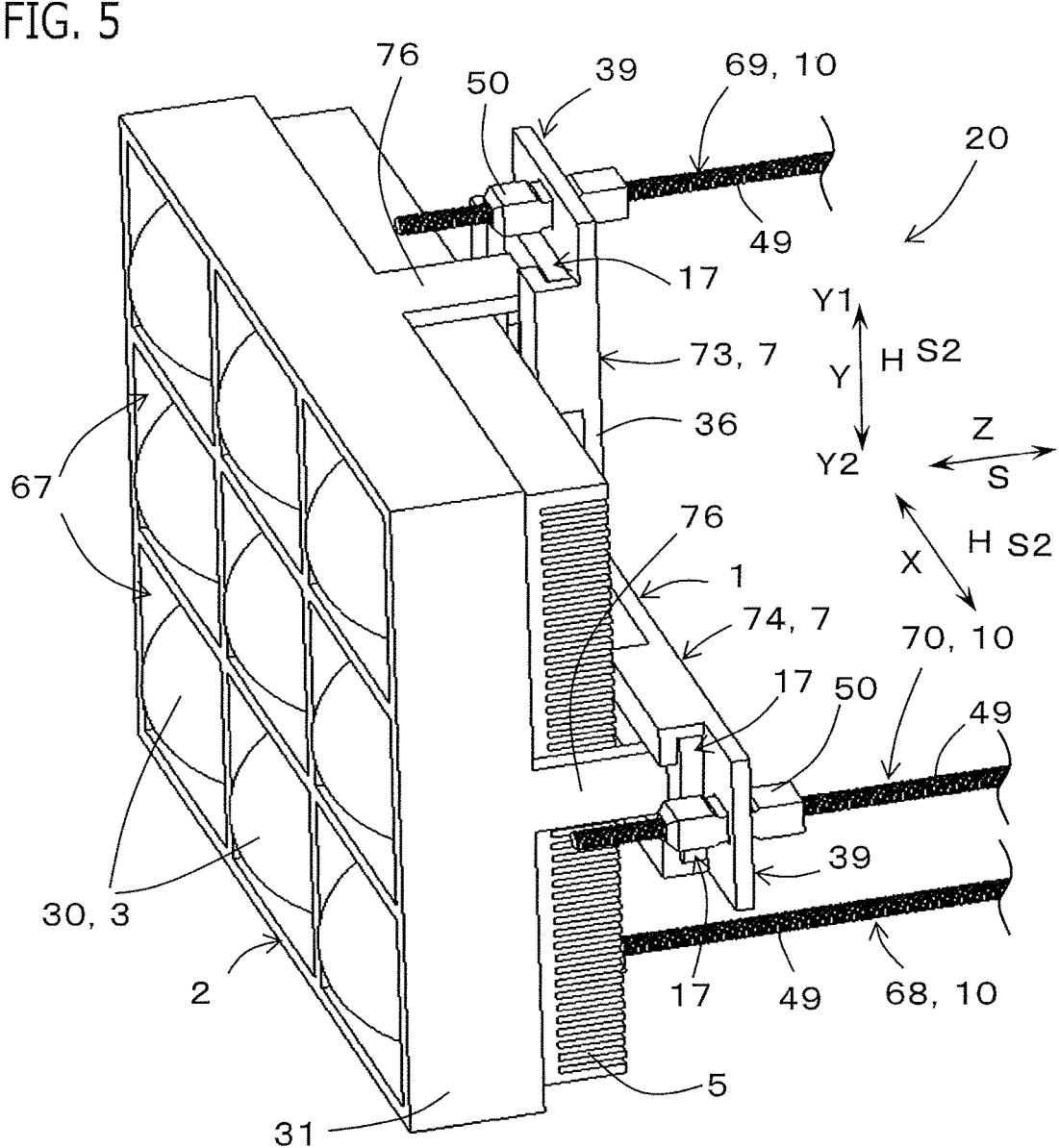
FIG. 5 is a perspective view of a vehicle light source unit according to Embodiment 2 of the present invention.
Figure 6:
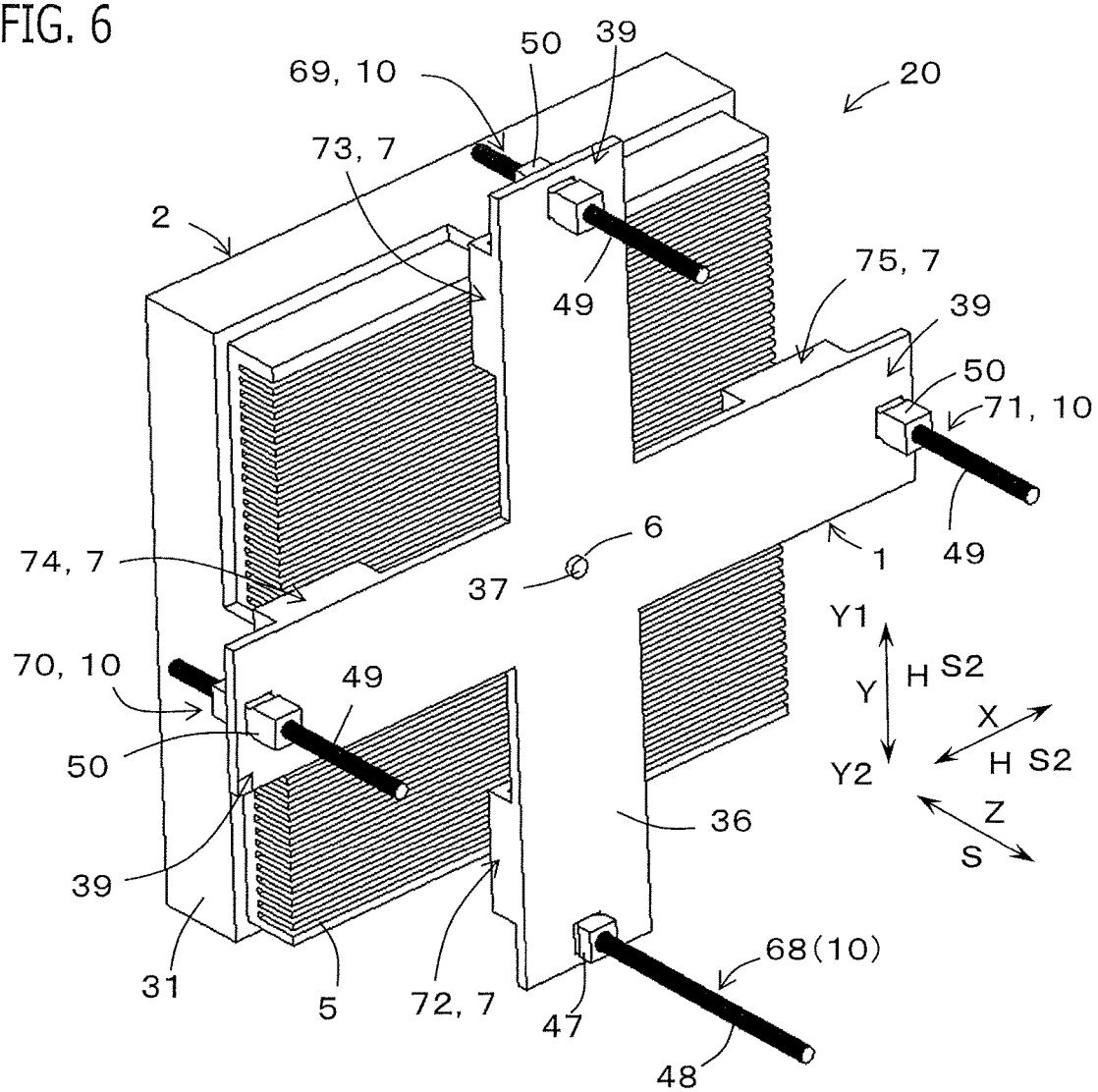
FIG. 6 is a perspective view of the vehicle light source unit according to Embodiment 2 of the present invention.
Figure 7:
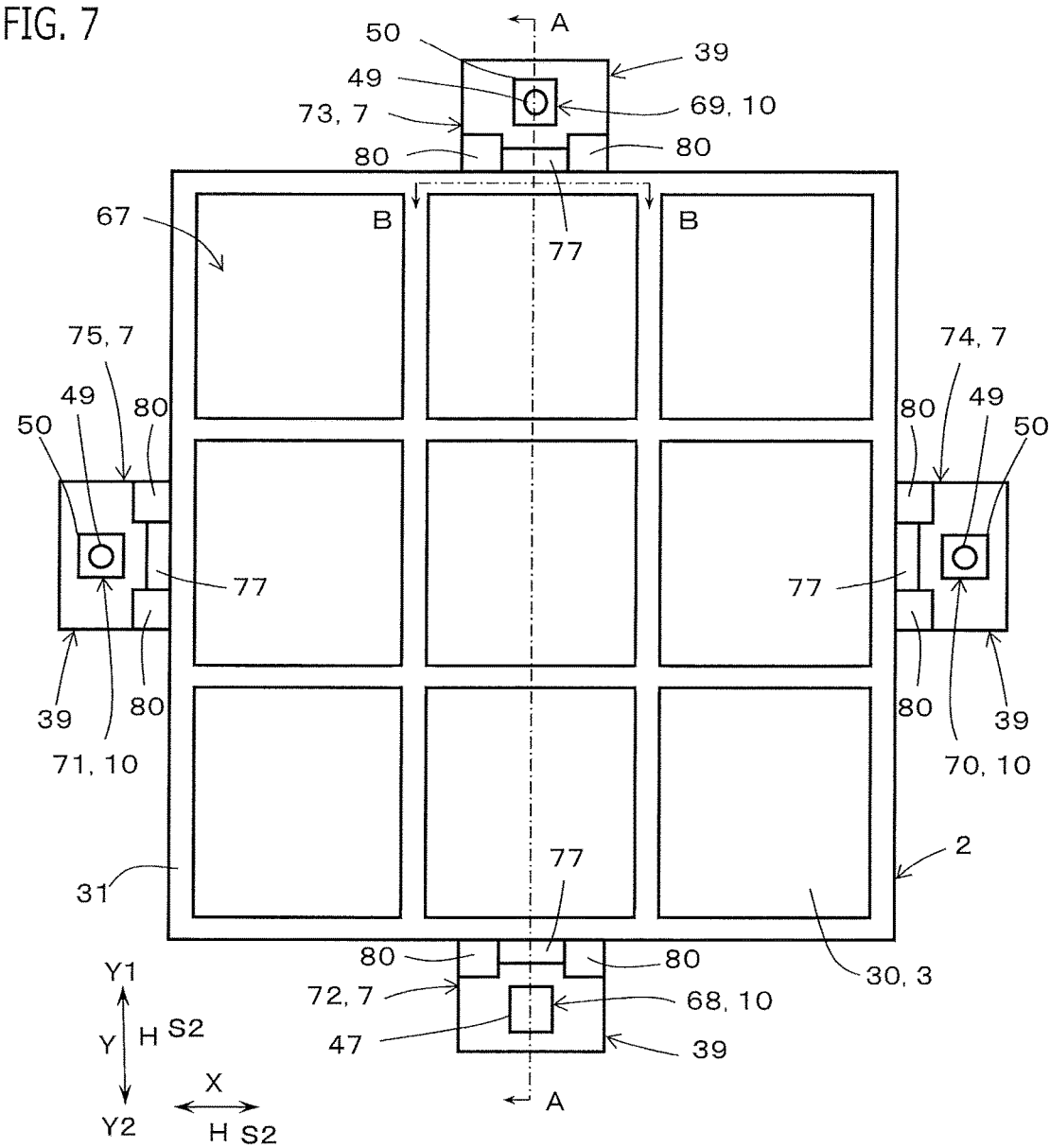
FIG. 7 is an elevation view of the vehicle light source unit according to Embodiment 2 of the present invention.
Figure 8:
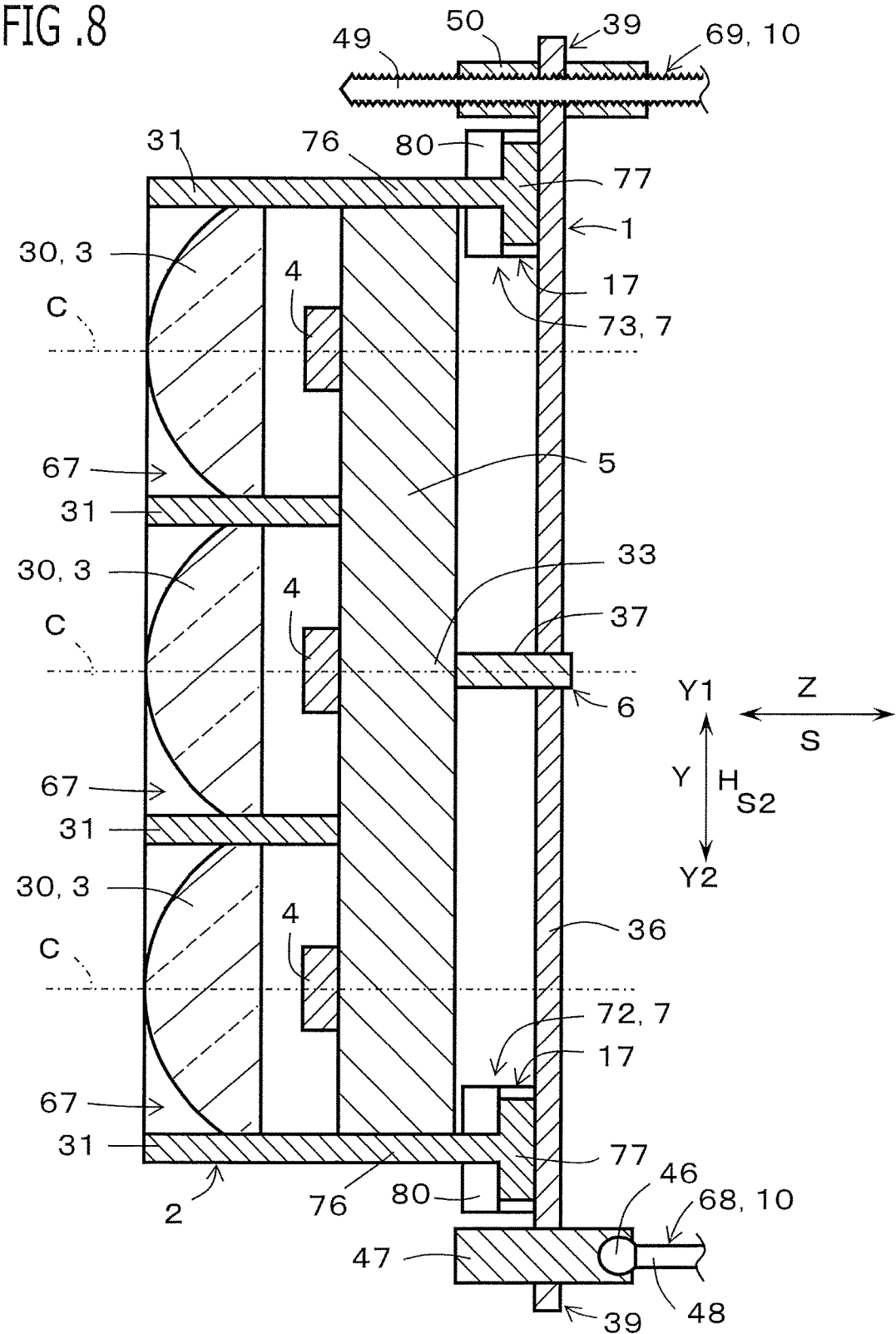
FIG. 8 is a cross-sectional view of the vehicle light source unit according to Embodiment 2 of the present invention.

Next, the light source unit 20 according to Embodiment 2 will be explained. FIG. 5 is a perspective view of the light source unit 20 according to Embodiment 2, when viewed from a position diagonally in front of it; FIG. 6 is a perspective view of the light source unit 20, when viewed from a position diagonally behind it; FIG. 7 is an elevation view of the light source unit 20, when viewed from a position in front of it in the optical axis direction Z; FIG. 8 is a cross-sectional view at a time when the light source unit 20 is cut along a plane, at the A-A cross-sectional position in FIG. 7, that is parallel to the optical axis direction Z and the second perpendicular direction Y; FIG. 9 is a cross-sectional view of principal parts at a time when the light source unit 20 is cut along a plane, at the B-B cross-sectional position in FIG. 7, that is parallel to the optical axis direction Z and the first perpendicular direction X. The explanation for constituent parts that are the same as those in Embodiment 1 will be omitted.

The optical portion 3 has two or more (nine, in this example) lenses 30. The two or more lenses 30 are arranged in a grid manner. In Embodiment 2, the two or more lenses 30 are arrange in a grid manner in such a way that the same number of (three, in this example) lenses are aligned in each of the first perpendicular direction X and the second perpendicular direction Y. Each of the lenses 30 is a planoconvex lens whose front face is a sphere and whose rear face is a plane; the periphery of the planoconvex lens is chamfered along four planes that are parallel to the optical axis direction Z, the first perpendicular direction X, the second perpendicular direction Y; the cross section perpendicular to the optical axis direction Z is formed in a rectangular (square, in this example) shape. The respective optical axes C of the lenses 30 are parallel to one another.

The optical case portion 31 has a grid-shaped wall in which the respective walls surrounding the lenses 30 are formed in a grid manner; respective housing chambers 67 for housing the lenses 30 are provided in a grid manner. In Embodiment 2, the two or more (nine, in this example) housing chambers 67 are arrange in a grid manner in such a way that the same number of (three, in this example) housing chambers are aligned in each of the first perpendicular direction X and the second perpendicular direction Y. Each of the housing chambers is in the shape of a tube extending in the optical axis direction Z and is formed in the shape of a rectangular tube whose cross section perpendicular to the optical axis direction Z is in the shape of a rectangle (square, in this example) having sides parallel to the first perpendicular direction X or the second perpendicular direction Y.

The optical case portion 31 is formed in such a way that the outer shape thereof is a rectangular parallelepiped having sides parallel to the optical axis direction Z, the first perpendicular direction X, and the second perpendicular direction Y; the cross section perpendicular to the optical axis direction Z is in the shape of a square. Accordingly, the longitudinal direction of the optical supporting portion 2 in Embodiment 1 can be set either to the first perpendicular direction X or the second perpendicular direction Y. That is to say, the longitudinal direction of the optical supporting portion 2 may be any one of the first perpendicular direction X and the second perpendicular direction Y.

In Embodiment 2, the heat radiation portion 5 is formed of a single heat sink. The heat radiation portion 5 is formed in such a way that the outer shape thereof is a rectangular parallelepiped having sides parallel to the optical axis direction Z, the first perpendicular direction X, and the second perpendicular direction Y; the size of the heat radiation portion 5 is sufficient to cover the respective rear openings of all the housing chambers 67 of the optical case portion 31. It may be allowed that the heat radiation portion 5 is formed of two or more heat sinks.

As is the case with Embodiment 1, the optical supporting portion 2 supports also the heat radiation portion 5. In Embodiment 2, the heat radiation portion 5 is fixed to the rear surface of the optical supporting portion 2 (optical case portion 31) by use of a fixation member such as a screw, an adhesive, or the like, and covers the respective rear openings of all the housing chambers 67 of the optical case portion 31.

As is the case with Embodiment 1, the light-emitting portion 4 is fixed to the heat radiation portion 5. In Embodiment 2, at least one light-emitting portion 4 is arranged in the housing chamber 67 and the rear face of each of the light-emitting portions 4 is fixed to the front face of the heat radiation portion 5.

In Embodiment 2, the metal-made supporting main body portion 36 is formed in such a way as to be spaced by a gap behind the optical supporting portion 2 and the heat radiation portion 5 and in such a way as to be in the shape of a cross-shaped plate expanding in the first perpendicular direction X and the second perpendicular direction Y. The cross-shaped intersection portion is superimposed on the center portion of the optical supporting portion 2 (the optical case portion 31) in the optical axis direction Z. The totally four coupling support portions 39 with which the respective coupling portions 10 are coupled are provided at the respective four end portions of the cross. As is the case with Embodiment 1, the metal-made supporting portion 1 is coupled with the base portion 23 by the angle-variable coupling portions 10 that each can adjust the mounting angle. In Embodiment 2, the angle-variable coupling portions 10 are configured in such a way that four movable coupling axles 68, 69, 70, and 71 support the four respective end portions of the cross in a four-point supporting manner.

The first movable coupling axle 68 that supports the end portion, at the other side Y2 (the lower side, in this example) in the second perpendicular direction, of the cross is a ball-pivot axle. The second movable coupling axle 69 that supports the end portion, at the one side Y1 (the upper side, in this example) in the second perpendicular direction, of the cross and the third and fourth movable coupling axles 70 and 71 that support the respective end portions, at the one and the other sides in the first perpendicular direction, of the cross are feed-screw mechanisms. The second movable coupling axle 69 adjusts the angle of the optical axis C with respect to the base portion 23 to the second perpendicular direction Y; the third and fourth movable coupling axles 70 and 71 adjust the angle of the optical axis C with respect to the base portion 23 to the first perpendicular direction X. It may be allowed that the first movable coupling axle 68 is also a feed-screw mechanism.

In Embodiment 2, one fixing portion 6 is provided, and two or more sliding portions 7 are arranged radially around the fixing portion 6. Each of the sliding directions H of the sliding portions 7 is substantially parallel to the radial direction with respect to the fixing portion 6. Accordingly, each of the sliding directions H of the sliding portions 7 is substantially parallel to the straight line connecting the corresponding sliding portion 7 and the fixing portion 6. In this configuration, when expand or contract due to a change with temperature, one of or both of the metal-made supporting portion 1 and the optical supporting portion 2 are relatively deformed in the radial direction with respect to the one fixing portion 6 with which the metal-made supporting portion 1 and the optical supporting portion 2 are fixed to each other. In the foregoing configuration, because the sliding portions 7 slides in the sliding direction H that is substantially parallel to the radial direction, the relative deformation in the radial direction can be prevented; thus, it can be suppressed that the deformation is restrained, a stress is caused, and then a deformation such as a warp is caused in one of or both of the metal-made supporting portion 1 and the optical supporting portion 2. Moreover, because the two or more sliding portions 7 are arranged radially around the fixing portion 6, it can be suppressed that at each of the positions where the respective sliding portions 7 are arranged radially around the fixing portion 6, a deformation such as a warp in the supporting direction S is caused in the metal-made supporting portion 1 and the optical supporting portion 2.

In Embodiment 2, the fixing portion 6 is disposed at a position where the fixing portion 6 is superimposed on the center portion of the optical supporting portion 2 when viewed in the optical axis direction Z. This configuration makes it possible to fix the center portion of the optical supporting portion 2 to the metal-made supporting portion 1 so as to prevent a relative deformation from being caused. As a result, it is made possible to prevent the center of the light source from deviating.

The metal-side fixing portion 37 is formed of a protrusion portion protruding forward from the metal-made supporting main body portion 36; the front end portion of the protrusion portion is fixed to the optical supporting portion 2 by use of a fixation member such as a screw or an adhesive. In this example, the front end portion of the protrusion portion is fixed to the heat radiation portion 5 fixed to the optical supporting portion 2. That is to say, the metal-side fixing portion 37 is fixed to the optical supporting portion 2 through the intermediary of the heat radiation portion 5. It may be allowed that the metal-side fixing portion 37 penetrates the heat radiation portion 5 so as to be directly fixed to the optical supporting portion 2.

Four sliding portions 7 are provided in a cross-shaped radial manner with respect to the fixing portion 6 disposed at the center portion of the optical supporting portion 2. This configuration makes it possible that the sliding portions 7 supports the periphery, mainly the center portion, of the optical supporting portion 2 in a balanced manner; thus, it is made possible to suppress a deformation such as a warp from being caused in the periphery of the optical supporting portion 2. In this example, a first sliding portion 72 is disposed at the other side Y2 (at the lower side, in this example), in the second perpendicular direction, of the fixing portion 6; a second sliding portion 73 is disposed at the one side Y1 (at the upper side, in this example), in the second perpendicular direction, of the fixing portion 6; a third sliding portion 74 is disposed at the one side, in the first perpendicular direction, of the fixing portion 6; a fourth sliding portion 75 is disposed at the other side, in the first perpendicular direction, of the fixing portion 6. The respective sliding directions H of the first and second sliding portions 72 and 73 are parallel to the second perpendicular direction Y, which is the radial direction, with respect to the fixing portion 6, of each of the sliding portions 72 and 73. The respective sliding directions H of the third and fourth sliding portions 74 and 75 are parallel to the first perpendicular direction X, which is the radial direction, with respect to the fixing portion 6, of each of the sliding portions 74 and 75. The sliding direction H is substantially perpendicular (perpendicular, in this example) to the optical axis direction Z.

The two or more sliding portions 7, which are radially disposed, are arranged at the end portions of the optical supporting portion 2. This configuration makes it possible that up to the peripheral end portions of the optical supporting portion 2, the two or more sliding portions 7 suppress a whole warp in the optical supporting portion 2. In this example, the first sliding portion 72 is disposed at the end portion in the other side Y2 (the lower side), in the second perpendicular direction, of the optical supporting portion 2; the second sliding portion 73 is disposed at the end portion in the one side Y1 (the upper side), in the second perpendicular direction, of the optical supporting portion 2; the third sliding portion 74 is disposed at the end portion in the one side, in the first perpendicular direction, of the optical supporting portion 2; the fourth sliding portion 75 is disposed at the end portion in the other side, in the first perpendicular direction, of the optical supporting portion 2. Accordingly, it is made possible to suppress respective warps in all the four peripheral sides of the optical supporting portion 2.

Also in Embodiment 2, the sliding portion 7 has the sliding groove portion 17 that is groove-shaped and provided at any one of the metal-made supporting portion 1 and the optical supporting portion 2 and the sliding protrusion portion 18 that is protrusion-shaped, provided at the other one of the metal-made supporting portion 1 and the optical supporting portion 2, and slidably inserted into the sliding groove portion 17. The sliding direction H is the direction along which the sliding groove portion 17 extends; the supporting direction S is the transverse direction of the sliding groove portion 17. In Embodiment 2, the extending direction of the sliding groove portion 17 is substantially parallel (parallel, in this example) to the radial direction with respect to the fixing portion 6. The cross-sectional shape of the sliding groove portion 17 is a rectangular groove, and the cross-sectional shape of the sliding protrusion portion 18 is a rectangular protrusion.

In Embodiment 2, as illustrated in FIG. 9, each of the sliding portions 7 has two sliding groove portions 17 whose groove openings face each other and two sliding protrusion portions 18 that are inserted into the two respective sliding groove portions 17. In this configuration, the respective bottom surfaces of the one sliding groove portion 17 and the other sliding groove portion 17 face each other, and the faces, of the two sliding protrusion portions 18, that face the respective bottom surfaces of the two other sliding groove portions 17 are sliding surfaces. Therefore, the sliding portion 7 makes it possible that the metal-made supporting portion 1 and the optical supporting portion 2 support each other not only in the supporting direction S that is perpendicular to the sliding direction H but also toward one and the other sides of the second supporting direction S2 that is perpendicular to the supporting direction S and the sliding direction H. Accordingly, the sliding portions 7 makes it possible that the metal-made supporting portion 1 and the optical supporting portion 2 support each other in all the directions that are perpendicular to the sliding direction H; thus, it is made possible to suppress a deformation such as a warp from being caused in any one of all the directions that are perpendicular to the sliding direction H.

In Embodiment 2, the supporting direction S is substantially parallel (parallel, in this example) to the optical axis direction Z, and the second supporting direction S2 is substantially perpendicular (perpendicular, in this example) to the optical axis direction Z. The two sliding groove portions 17 and the two sliding protrusion portions 18 of the first sliding portion 72 extend in the second perpendicular direction Y; the two groove openings face each other in the first perpendicular direction X. The two sliding groove portions 17 and the two sliding protrusion portions 18 of the second sliding portion 73 extend in the second perpendicular direction Y; the two groove openings face each other in the first perpendicular direction X. The two sliding groove portions 17 and the two sliding protrusion portions 18 of the third sliding portion 74 extend in the first perpendicular direction X; the two groove openings face each other in the second perpendicular direction Y. The two sliding groove portions 17 and the two sliding protrusion portions 18 of the fourth sliding portion 75 extend in the first perpendicular direction X; the two groove openings face each other in the second perpendicular direction Y.

In Embodiment 2, the sliding groove portion 17 is provided in the metal-side sliding portion 38, and the sliding protrusion portion 18 is provided in the optical-side sliding portion 34. The metal-side sliding portion 38 has two L-shaped tabular members 80 that protrude forward from the both respective transverse end portions of each of the sides of the metal-made supporting main body portion 36 formed in the shape of a cross-shaped plate and then protrude inward. The two sliding groove portions 17 of each of the sliding portions 7 are formed of the two L-shaped tabular members 80 and the portion, of the metal-made supporting main body portion 36, that connects the two L-shaped tabular members 80.

The optical-side sliding portions 34 have extending portions 76 that extend backward from the respective center portions of the side face portions of the optical case portion 31 and rectangular tabular protrusion forming portions 77 that extend in the sliding direction H from the respective rear end portions of the extending portions 76. The both respective transverse end portions of the protrusion forming portion 77 are the two sliding protrusion portions 18.

3. Embodiment 3

Next, the light source unit 20 according to Embodiment 3 will be explained. FIG. 10 is a cross-sectional view at a time when the light source unit 20 is cut along a plane that is parallel to the optical axis direction Z and the second perpendicular direction Y. The explanation for constituent parts that are the same as those in Embodiment 1 will be omitted.

In Embodiment 3, the light-emitting portion 4 is fixed to the metal-made supporting portion 1 without the intermediary of the optical supporting portion 2. This configuration makes it possible that heat generated by the light-emitting portion 4 is transferred to the metal-made supporting portion 1 so that the heat is not directly transferred to the optical supporting portion 2. Describing in detail, the respective rear faces of the light-emitting portions 4 are fixed to the front face of the metal-made supporting main body portion 36 by use of a fixation member such as a screw, an adhesive, or the like. Accordingly, it is made possible to suppress the heat in the light-emitting portion 4 from raising the temperature of the optical supporting portion 2, so that the thermal expansion of the optical supporting portion 2 can be suppressed. As a result, it is made possible to further lighten the optical supporting portion 2 and the like and to simplify the configuration of the sliding portions 7. The operation of the sliding portion 7 and the like can suppress the optical axis C from deviating due to a change in the ambient temperature and heat generation caused by the light emitted by the light-emitting portion 4. Because transferred to the metal-made supporting portion 1 whose heat-conductivity is high, the heat in the light-emitting portion 4 can efficiently be radiated.

The metal-made supporting portion 1 supports the heat radiation portion 5. The front face of the fin base portion is fixed to the rear face of the metal-made supporting main body portion 36 by use of a fixation member such as a screw, an adhesive, or the like. Accordingly, the heat, in the light-emitting portion 4, that is transferred to the metal-made supporting portion 1 can efficiently be radiated through the heat radiation portion 5. The metal-made supporting portion 1 and the heat radiation portion 5 may be integrally formed, for example, the metal-made supporting portion 1 is bent so that the surface area thereof is increased, or fins are formed in the metal-made supporting portion 1.

4. Embodiment 4

Figure 12:
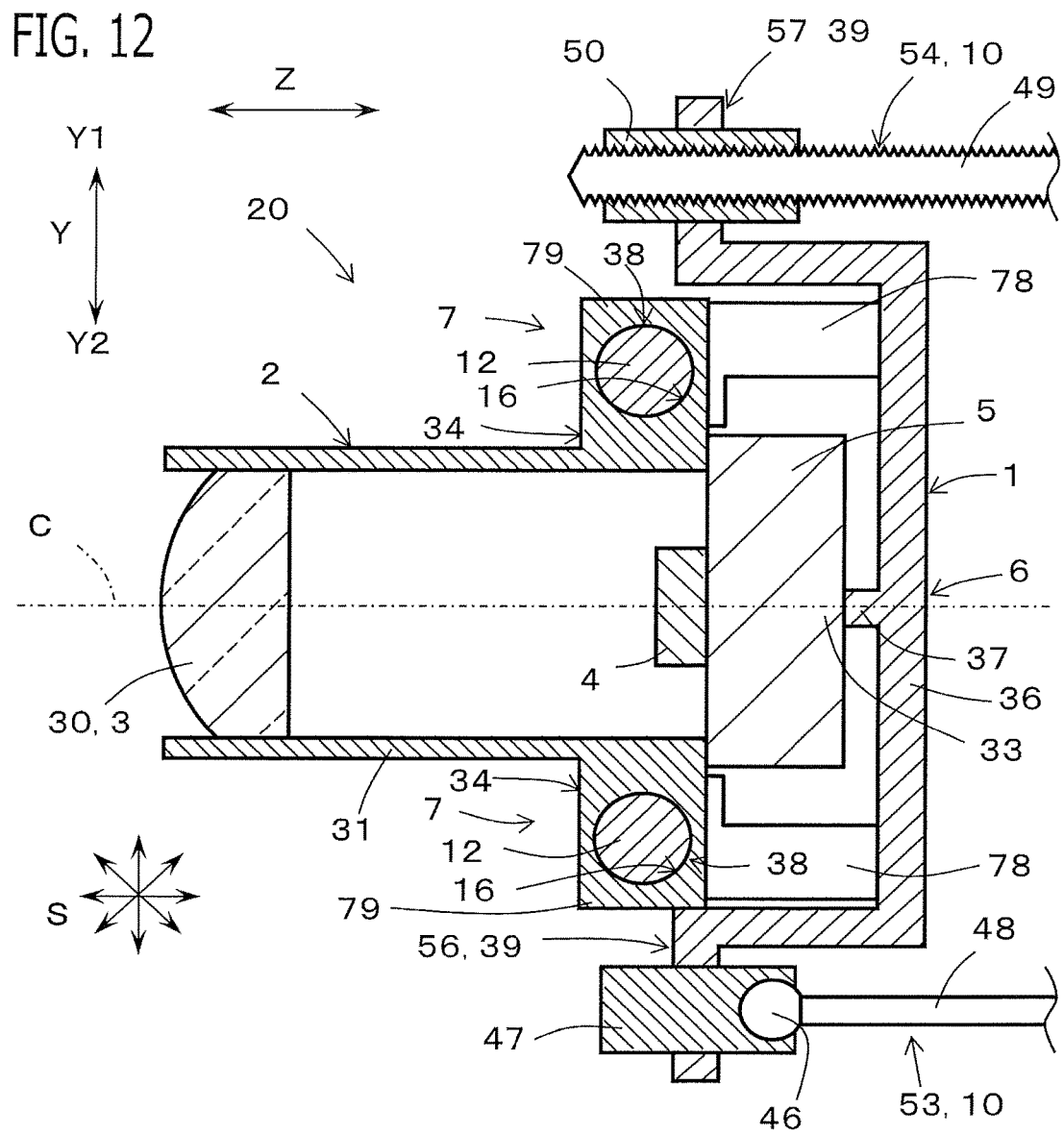
FIG. 12 is a cross-sectional view of the vehicle light source unit according to Embodiment 4 of the present invention.

Next, the light source unit 20 according to Embodiment 4 will be explained. FIG. 11 is a perspective view of the light source unit 20 according to Embodiment 4, when viewed from a position diagonally in front of it; FIG. 12 is a cross-sectional view at a time when the light source unit 20 is cut along a plane that is parallel to the optical axis direction Z and the second perpendicular direction Y. The explanation for constituent parts that are the same as those in Embodiment 1 will be omitted.

In Embodiment 4, the sliding portion 7 has a columnar portion 12 that is columnar and provided at any one of the metal-made supporting portion 1 and the optical supporting portion 2 and a tubular portion 16 that is tubular, provided at the other one of the metal-made supporting portion 1 and the optical supporting portion 2, and slidably fits with the columnar portion 12. The sliding direction H is the axle direction of the columnar portion 12; the supporting direction S is the radial direction of the columnar portion 12. This configuration makes it possible that the metal-made supporting portion 1 and the optical supporting portion 2 support each other in all the directions that are perpendicular to the sliding direction H; thus, it is made possible to suppress a deformation such as a warp from being caused in any one of all the directions that are perpendicular to the sliding direction H. Moreover, because the columnar portion 12 functions as a support post, one of or both of the metal-made supporting portion 1 and the optical supporting portion 2 can be strengthened. When the strength of the columnar portion 12 is raised, for example, by being thickened, one of or both of the metal-made supporting portion 1 and the optical supporting portion 2 can readily be strengthened.

In Embodiment 4, the columnar portion 12 is formed in the shape of a cylindrical column. The columnar portion 12 is made of metal. The columnar portion 12 is fixed at the metal-made supporting portion 1 and is included in the metal-side sliding portion 38. The tubular portion 16 is fixed at the optical supporting portion 2 and is included in the optical-side sliding portion 34. The columnar portion 12 is disposed in such a way as to extend along the longitudinal direction of the optical supporting portion 2; the sliding direction H is substantially parallel (parallel, in this example) to the longitudinal direction of the optical supporting portion 2. The optical case portion 31 and the lens 30 are formed in the same manner as those in Embodiment 1; the first perpendicular direction X is parallel to the longitudinal direction of the optical supporting portion 2.

The metal-side sliding portions 38 have two or more (two, in this example) extending portions 78 extending forward from the metal-made supporting main body portion 36; a through-hole into which the columnar portion 12 is inserted is formed in each of the front end portions of the extending portions 78. The columnar portion 12 is inserted into the through-hole in the extending portion 78; the extending portion 78 and the columnar portion 12 are fixed to each other by use of a fixation member such as a screw, an adhesive, or the like. The optical-side sliding portions 34 have two or more (three, in this example) protruding portions 79 that protrude to the outer circumference side from the optical case portion 31. A through-hole into which the columnar portion 12 is inserted is formed in each of the protruding portions 79. The columnar portion 12 is inserted into the through-hole in the protruding portion 79. The inner circumferential surface of the through-hole in the protruding portion 79 and the outer circumferential surface of the columnar portion 12 are sliding surfaces. The through-holes in the two or more extending portions 78 and the through-holes in the two or more protruding portions 79 are formed in such a way as to be in a row so that they are fit with a single columnar portion 12; the extending portions 78 and the protruding portions 79 are alternately arranged.

In Embodiment 4, two sets of sliding portions 7 are provided, i.e., there are provided two columnar portions 12 and two tubular portions 16 that fit with the respective columnar portions 12. One of the two sets of sliding portions 7 is provided at the one side Y1 (the upper side, in this example), in the second perpendicular direction, of the optical supporting portion 2; the other one of the two sets of sliding portions 7 is provided at the other side Y2 (the lower side, in this example), in the second perpendicular direction, of the optical supporting portion 2. Accordingly, because the sliding portions 7 are provided at the both sides, i.e., at the one side Y1 and the other side Y2 in the second perpendicular direction that is perpendicular to the longitudinal direction, the suppression effect for a warp in the optical supporting portion 2, which is elongated in the longitudinal direction, can be raised.

The three protruding portions 79 (tubular portions 16) in the one set protrude toward the one side Y1 (the upper side) in the second perpendicular direction from the center portion and the both end portions, in the longitudinal direction, at the rear end portion, of the optical case portion 31, that is at the one side Y1 (the upper side) in the second perpendicular direction. The three protruding portions 79 are arranged in a row along the longitudinal direction and in such a way as to be spaced from one another. The extending portion 78 is disposed between the protruding portions 79. One of the columnar portions 12 is disposed at the one side Y1 (the upper side), in the second perpendicular direction, of the optical case portion 31.

The three protruding portions 79 (tubular portions 16) in the other set protrude toward the other side Y2 (the lower side) in the second perpendicular direction from the center portion and the both end portions, in the longitudinal direction, at the rear end portion, of the optical case portion 31, that is at the other side Y2 (the lower side) in the second perpendicular direction. The three protruding portions 79 are arranged in a row along the longitudinal direction and in such a way as to be spaced from one another. The extending portion 78 is disposed between the protruding portions 79. The other one of the columnar portions 12 is disposed at the other side Y2 (the lower side), in the second perpendicular direction, of the optical case portion 31.

As is the case with Embodiment 1, the heat radiation portion 5 is fixed to the rear surface of the optical case portion 31 by use of a fixation member such as a screw, an adhesive, or the like, and covers the respective rear openings of all the housing chambers 67 of the optical case portion 31.

As is the case with Embodiment 2, the metal-side fixing portion 37 is formed of a protrusion portion protruding forward from the metal-made supporting main body portion 36; the front end portion of the protrusion portion is fixed to the heat radiation portion 5 fixed to the optical supporting portion 2, by use of a fixation member such as a screw, an adhesive, or the like. It may be allowed that the metal-side fixing portion 37 penetrates the heat radiation portion 5 so as to be directly fixed to the optical supporting portion 2.

It may be allowed that only one set of sliding portion 7 having the columnar portion 12 and the tubular portion 16 is provided or that three or more sets of sliding portions 7 are provided. It may be allowed that the two or more columnar portions 12 are not parallel to one another. It may be allowed that the cross-sectional shape of the columnar portion 12 is not circular but arbitrary; for example, the columnar portion 12 may be configured in such a way that a groove or a protrusion is formed so that the rotation around the axle is restrained.

5. Embodiment 5

Figure 13:
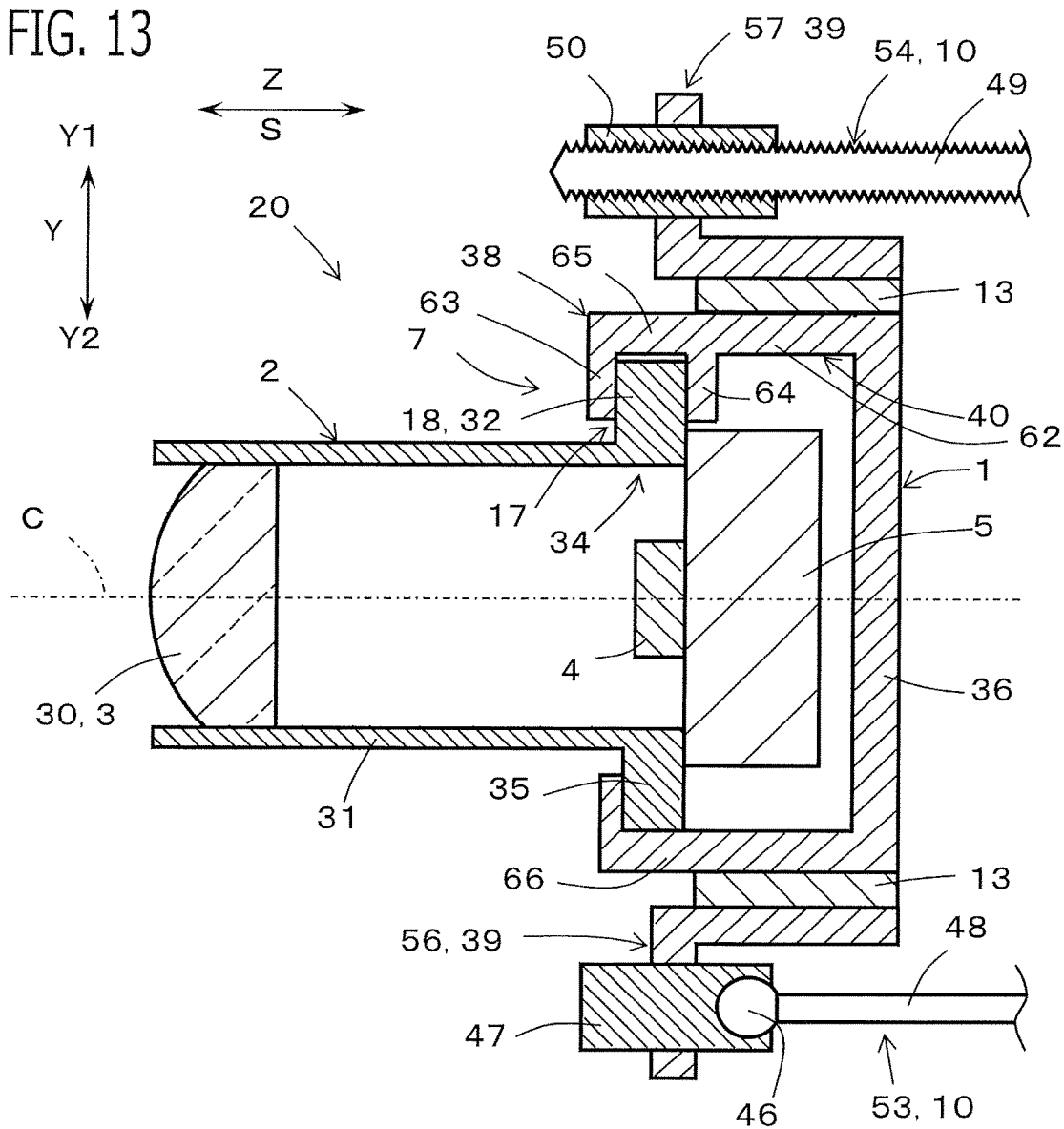
FIG. 13 is a cross-sectional view of a vehicle light source unit according to Embodiment 5 of the present invention.

Next, a light source unit 20 according to Embodiment 5 will be explained. FIG. 13 is a cross-sectional view at a time when the light source unit 20 according to Embodiment 5 is cut along a plane that is parallel to the optical axis direction Z and the second perpendicular direction Y. The explanation for constituent parts that are the same as those in Embodiment 1 will be omitted.

In Embodiment 5, the metal-made supporting portion 1 is supported through the intermediary of an elastic member 13. This configuration makes it possible that while the metal-made supporting portion 1 is made of metal in order to keep the strength thereof, the elastic member 13 attenuates vibration and external force. As the elastic member 13, rubber, a metal spring, a resin spring, or the like (rubber, in this example) can be utilized.

In Embodiment 5, the elastic member 13 is provided between the metal-made supporting main body portion 36 and the coupling support portion 39; thus, it is made possible that the vibration is hardly to be transferred from the vehicle to the light source unit 20 through the intermediary of the coupling portion 10 and the coupling support portion 39. The elastic member 13 is provided between the metal-made supporting main body portion 36 and each of the coupling support portions 39. It may be allowed that the elastic member 13 is not provided between the metal-made supporting main body portion 36 and each of the coupling support portions 39; it may be allowed that the elastic member 13 is provided at least one arbitrary position on the metal-made supporting portion 1.

6. Embodiment 6

Figure 14:
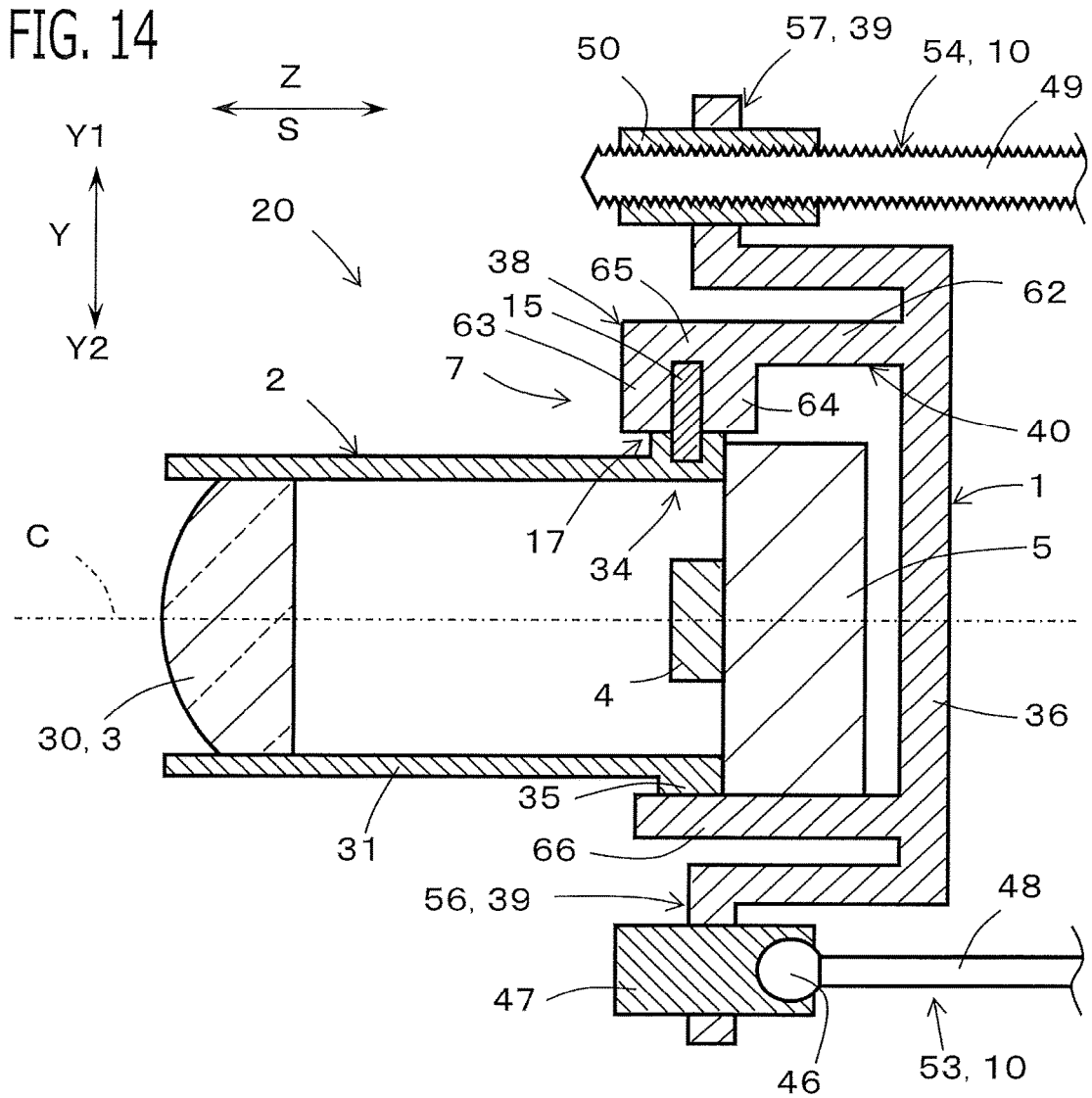
FIG. 14 is a cross-sectional view of a vehicle light source unit according to Embodiment 6 of the present invention.

Next, a light source unit 20 according to Embodiment 6 will be explained. FIG. 14 is a cross-sectional view at a time when the light source unit 20 according to Embodiment 6 is cut along a plane that is parallel to the optical axis direction Z and the second perpendicular direction Y. The explanation for constituent parts that are the same as those in Embodiment 1 will be omitted.

In Embodiment 6, the sliding part, at the optical supporting portion 2, of the sliding portion 7 is made of metal. In this configuration, even when due to repeatedly exerted external force or a change with temperature, the sliding portion 7 repeatedly slides, the lifetime against the abrasion caused by the slide on the sliding part at the metal-made supporting portion 1 can be prolonged by making the sliding part at the optical supporting portion 2 of metal.

In Embodiment 6, the sliding part, at the optical supporting portion 2, of the sliding portion 7 is a part of a metal portion 15 inserted into and molded with the optical supporting portion 2 made of resin. When the optical supporting portion 2 is made of resin, it causes anxiety about the tolerance to the abrasion; however, when the sliding part is formed of the metal portion 15 inserted into and molded with a resin, it is made possible that while the optical supporting portion 2 is lightened, the lifetime against the abrasion is prolonged, as described above.

In Embodiment 6, the protruding portion 32, in Embodiment 1, that protrudes to the outer circumference side from the optical case portion 31 is formed of the metal portion 15 that is rectangular-parallelepiped and is inserted into and molded with the optical case portion 31 made of resin; the metal portion 15 protrudes to the outer circumference side (the one side Y1 in the second perpendicular direction, in this example) from the optical case portion 31.

It may be allowed that an arbitrary number of metal parts are provided not only in the sliding portions 7 but also at arbitrary positions in the optical supporting portion 2 so that the optical supporting portion 2 is reinforced.

It may be allowed that in Embodiment 4, the columnar portion 12 made of metal is fixed to the optical supporting portion 2 and the tubular portion 16 made of metal is fixed to the metal-made supporting portion 1 so that the metal columnar portion 12 and the metal tubular portion 16 on the metal-made supporting portion 1 slide on each other. Specifically, it may be allowed that the through-hole in the metal extending portion 78 extending forward from the metal-made supporting main body portion 36 and the columnar portion 12 can slide on each other and that the through-hole in the protruding portion 79 protruding from the optical case portion 31 and the columnar portion 12 are fixed to each other by use of a fixation member such as a screw, an adhesive, or the like.

7. Embodiment 7

Figure 15:
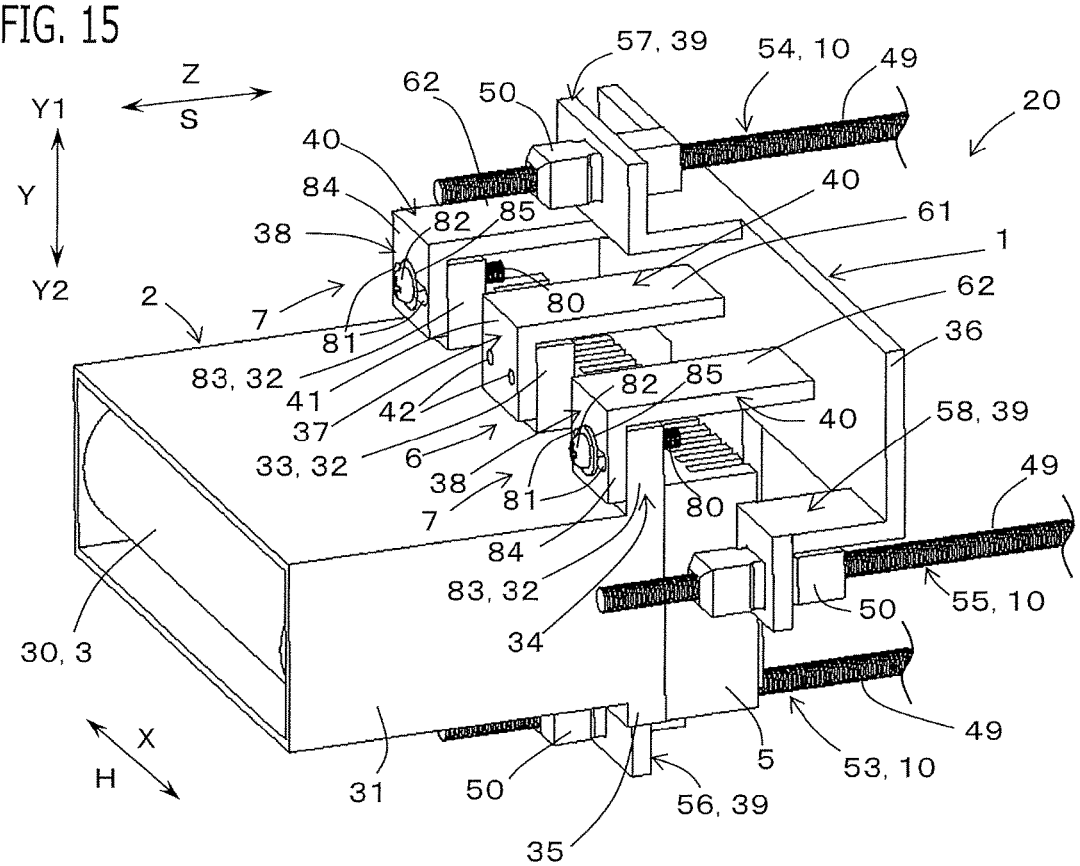
FIG. 15 is a perspective view of a vehicle light source unit according to Embodiment 7 of the present invention.
Figure 16:
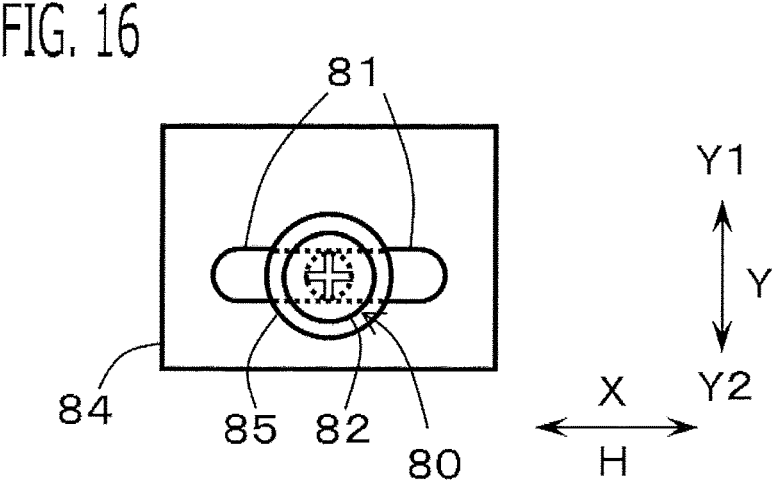
FIG. 16 is an elevation view of principal parts in the vehicle light source unit according to Embodiment 7 of the present invention.

Next, a light source unit 20 according to Embodiment 7 will be explained. FIG. 15 is a perspective view of the light source unit 20 according to Embodiment 7, when viewed from a position diagonally in front of it; FIG. 16 is an elevation view of the principal parts of the sliding portion 7, when viewed from a position in front of it in the optical axis direction Z. The explanation for constituent parts that are the same as those in Embodiment 1 will be omitted.

In Embodiment 7, the sliding portion 7 has a headed screw 80 that is fixed to any one of the metal-made supporting portion 1 and the optical supporting portion 2 and a transversely long through-hole portion 81 that is provided in the other one thereof and whose through-hole through which the headed screw 80 passes is elongated in the transverse direction perpendicular to the penetration direction of the headed screw 80. The sliding direction H is the transverse direction in which the transversely long through-hole portion 81 is elongated; the supporting direction S is the penetration direction of the headed screw 80. This configuration makes it possible that a head portion 82 of the headed screw 80 and the portion of any one of the metal-made supporting portion 1 and the optical supporting portion 2, to which the headed screw 80 is fixed, interpose a portion of the other one of the metal-made supporting portion 1 and the optical supporting portion 2 from the both side in the supporting direction S, which is the penetration direction, so that the support can be performed in the one side and the other side in the supporting direction S. The headed screw 80 can travel in the transverse direction in the transversely long through-hole portion 81; the transverse direction is the sliding direction H. As a result, the sliding portion 7 can appropriately be formed of the headed screw 80 and the transversely long through-hole portion 81.

In Embodiment 7, the one side portion to which the headed screw 80 is fixed is a the-one-side protrusion 83 protruding from the optical case portion 31. The other side portion in which the transversely long through-hole portion 81 is provided is a the-other-side protrusion 84 protruding from the metal-made supporting portion 1. Under the condition that the face of the other side (the front side, in this example), in the supporting direction S, of the the-one-side protrusion 83 and the face of the one side (the rear side, in this example), in the supporting direction S, of the the-other-side protrusion 84 slidably abut on each other, the headed screw 80 is inserted into the transversely long through-hole portion 81 formed in the the-other-side protrusion 84, from the other side (the front side), in the supporting direction S, of the the-other-side protrusion 84, and then is screwed into a screw hole formed in the the-one-side protrusion 83; after that, from the one side (the backward side) in the supporting direction S, a nut (unillustrated) is screwed and fixed on the portion, of the headed screw 80, that protrudes from the the-one-side protrusion 83 to the one side (the backward side) in the supporting direction S. The head portion 82 of the headed screw 80 slidably abuts on the face, at the other side (the front side) in the supporting direction S, of the the-other-side protrusion 84. An annular-disk washer 85 is provided between the head portion 82 and the the-other-side protrusion 84. The the-one-side protrusion 83 forms the optical-side sliding portion 34; the the-other-side protrusion 84 forms the metal-side sliding portion 38.

The sliding direction H is substantially parallel (parallel, in this example) to the longitudinal direction of the optical supporting portion 2. The sliding direction H is substantially perpendicular (perpendicular, in this example) to the optical axis direction Z of the optical portion 3. The sliding portions 7 are disposed at the end portions of the optical supporting portion 2. There are provided one fixing portion 6 and two or more (two, in this example) sliding portions 7. The fixing portion 6 is disposed at the center portion, in the longitudinal direction, of the optical supporting portion 2; the sliding portions 7 are arranged at the both longitudinal-direction end portions of the optical supporting portion 2 interposing the fixing portion 6. The fixing portion 6 is disposed at the center of the end portion of one side Y1 (the upper side, in this example), in the second perpendicular direction, of the optical supporting portion 2; the sliding portions 7 are arranged at the both longitudinal-direction ends of the end portion of the one side Y1 (the upper side, in this example), in the second perpendicular direction, of the optical supporting portion 2.

As is the case with Embodiment 1, the optical supporting portion 2 has three protruding portions 32 that protrude from the optical case portion 31. The three protruding portions 32 protrude toward the one side Y1 (the upper side) of the second perpendicular direction from the center portion and the both end portions, in the longitudinal direction, at the rear end portion, of the optical case portion 31, that is at the one side Y1 (the upper side) of the second perpendicular direction. The three protruding portions 32 are arranged in a row along the longitudinal direction and in such a way as to be spaced from one another. The protruding portion 32 at the center in the longitudinal direction forms the optical-side fixing portion 33; the two protruding portions 32 at the both ends in the longitudinal direction each form the the-one-side protrusion 83.

Each of the two the-one-side protrusions 83 is formed in the shape of a rectangular parallelepiped having sides parallel to the optical axis direction Z or the longitudinal direction. Accordingly, each of the two the-one-side protrusions 83 has the front face that is perpendicular to the optical axis direction Z; the front face is the sliding surface that slides on the rear face of the the-other-side protrusion 84. In each of the two the-one-side protrusions 83, there is provided a screw hole that penetrates the the-one-side protrusion 83 in the optical axis direction Z; the headed screw 80 is screwed into the screw hole.

The metal-made supporting portion 1 has two or more extending portions 40 that extend forward from the metal-made supporting main body portion 36. These extending portions 40 form the metal-side sliding portions 38 and the metal-side fixing portion 37. In Embodiment 7, three extending portions 40 are provided and protrude forward from the metal-made supporting main body portion 36. The three extending portions 40 are arranged in a row along the longitudinal direction and in such a way as to be spaced from one another. The extending portion 40 at the center in the longitudinal direction forms the metal-side fixing portion 37; the two extending portions 40 at the both sides in the longitudinal direction each form the metal-side sliding portion 38.

The metal-side sliding portion 38 (the extending portion 40) has the the-other-side protrusion 84 that is rectangular-parallelepiped and extends toward the other side Y2 (the lower side) in the second perpendicular direction from the front end portion of the rectangular tabular portion 61 that extends forward. The the-other-side protruding portions 84 is formed in the shape of a rectangular parallelepiped having sides parallel to the optical axis direction Z or the longitudinal direction. Accordingly, the the-other-side protrusion 84 has front and rear faces that are perpendicular to the optical axis direction Z; the rear face of the the-other-side protrusion 84 is a sliding surface that slides on the front face of the the-one-side protrusion 83; the front face of the the-other-side protrusion 84 is a sliding surface that slides on the head portion 82 (the washer 85, in this example) of the headed screw 80.

In the the-other-side protrusion 84, there is formed the transversely long through-hole portion 81 that penetrates the the-other-side protrusion 84 in the optical axis direction Z and is elongated in its transverse direction parallel to the longitudinal direction. The headed screw 80 is inserted into the transversely long through-hole portion 81 from the forward side and then is screwed into a screw hole formed in the the-other-side protrusion 84. The headed screw 80 is fastened with as much torque as needed to enable the the-one-side protrusion 83 and the the-other-side protrusion 84 to slide on each other. The headed screw 80 penetrates the the-one-side protrusion 83 and protrudes backward; from the backward side, a nut (unillustrated) is screwed on the backward-side protruding portion so that the headed screw 80 is fixed to the the-one-side protrusion 83. The optical-side fixing portion 33 and the metal-side fixing portion 37 are configured in the same manner as those in Embodiment 1 are; thus, explanations therefor will be omitted.

It may be allowed that the headed screw 80 is screwed into a screw hole formed in the the-one-side protrusion 83 and is fixed not by a nut but by an adhesive. The headed screw 80 may be fixed in such a way that a gap exists between the headed screw 80 and the the-one-side protrusion 83. It may be allowed that the screw hole to be formed in the the-one-side protrusion 83 does not penetrate the the-one-side protrusion 83 but opens toward the other side (the forward side) in the supporting direction S. It may be allowed that the the-one-side portion to which the headed screw 80 is fixed is provided in the metal-made supporting portion 1 and that the the-other-side portion in which the transversely long through-hole portion 81 is provided is provided in the optical supporting portion 2.

Other Embodiments

Lastly, other embodiments of the present invention will be explained. Each of the configurations of embodiments to be explained below is not limited to be separately utilized but can be utilized in combination with the configurations of other embodiments as long as no discrepancy occurs.

(1) In each of the foregoing embodiments, as an example, there has been explained the case where the first perpendicular direction X is substantially parallel to the horizontal direction and the second perpendicular direction Y is substantially parallel to the vertical direction under the condition that the light source unit 20 is mounted in the vehicle 22. However, it may be allowed that the first perpendicular direction X and the second perpendicular direction Y are respective arbitrary directions under the condition that the light source unit 20 is mounted in the vehicle 22. For example, the first perpendicular direction X may be substantially parallel to the vertical direction, and the second perpendicular direction Y may be substantially parallel to the horizontal direction.

(2) In each of the foregoing embodiments, as an example, there has been explained the case where the optical supporting portion 2 is made of resin. However, it may be allowed that the optical supporting portion 2 is made of a material other than resin, for example, metal.

(3) In each of the foregoing embodiments, as an example, there has been explained the case where the sliding portions 7 are arranged at the end portion of the optical supporting portion 2. However, the sliding portions 7 may not be arranged at the end portion of the optical supporting portion 2.

(4) In each of the foregoing embodiments, as an example, there has been explained the case where the sliding direction H is substantially parallel to the longitudinal direction of the optical supporting portion 2. However, the sliding direction H may not be substantially parallel to the longitudinal direction of the optical supporting portion 2; for example, the sliding direction H may be substantially parallel to the transverse direction of the optical supporting portion 2.

(5) In each of the foregoing embodiments, as an example, there has been explained the case where the metal-made supporting portion 1 is coupled with the base portion 23 by the angle-variable coupling portions 10 that each can adjust the mounting angle of the metal-made supporting portion 1 with respect to the base portion 23. However, the metal-made supporting portion 1 may be coupled with the base portion 23 by the coupling portions 10 that each cannot adjust the mounting angle of the metal-made supporting portion 1 with respect to the base portion 23, and the metal-made supporting portion 1 may be coupled with the base portion 23 in such a way as to abut on the base portion 23.

(6) In each of the foregoing embodiments, as an example, there has been explained the case where the screw rotating portion 51 for rotating the feed screw rod 49 in the feed-screw mechanism is an engagement portion where a machine tool engages with the screw rotating portion 51. However, the screw rotating portion 51 is provided with an electric motor for rotating the feed screw rod 49; thus, it may be allowed that the angle of the optical axis C with respect to the base portion 23 can be changed through electronic control in which the electric motor is rotated toward one side or the other side in accordance with steering wheel operation of the vehicle 22.

(7) In each of the foregoing embodiments, as an example, there has been explained the case where the sliding direction H is substantially perpendicular to the optical axis direction Z of the optical portion 3. However, the sliding direction H may not be substantially perpendicular to the optical axis direction Z of the optical portion 3.

(8) In each of the foregoing embodiments, as an example, there has been explained the case where the supporting direction S is substantially parallel to the optical axis direction Z of the optical portion 3. However, the supporting direction S may not be substantially parallel to the optical axis direction Z of the optical portion 3.

(9) In each of the foregoing embodiments, as an example, there has been explained the case where the light source unit 20 has the heat radiation portion 5. However, the light source unit 20 may not have the heat radiation portion 5.

(10) In each of the foregoing embodiments, as an example, there has been explained the case where the optical case portion 31 is formed in the shape of a tube. However, the optical case portion 31 may be formed in the shape of not a tube but a plate, a groove, a block, or the like.

(11) In each of the foregoing embodiments, as an example, there has been explained the case where the optical portion 3 has the lens 30. However, the optical portion 3 may have a reflector, a prism, or the like.

(12) In each of the foregoing embodiments, as an example, there has been explained the case where the respective sliding portions 7 are arranged on the same plane. However, the respective sliding portions 7 may be arranged on different planes.

(13) In each of the foregoing embodiments, as an example, there has been explained the case where the distance between the fixing portion 6 and each of the sliding portions 7 is the same. However, the distances between the fixing portion 6 and the respective sliding portions 7 may differ from each other, for example, when the shape of the optical supporting portion 2 is taken into consideration.

(14) In each of the foregoing embodiments, as an example, there has been explained the case where the light-emitting portion 4 is fixed to the heat radiation portion 5 or the metal-made supporting portion 1. However, the light-emitting portion 4 may be fixed to the optical supporting portion 2.

In the scope of the present invention, the embodiments thereof can freely be combined with one another and can appropriately be modified or omitted.

INDUSTRIAL APPLICABILITY

The present invention can appropriately be applied to a vehicle light source unit in which a light-emitting portion and an optical portion thereof are supported by a supporting portion.

REFERENCE SIGNS LIST

1: metal-made supporting portion
2: optical supporting portion
3: optical portion
4: light-emitting portion
5: heat radiation portion
6: fixing portion
7: sliding portions
10: coupling portion (angle-variable coupling portion)
12: columnar portion
13: elastic member
15: metal portion
16: tubular portion
17: sliding groove portion
18: sliding protrusion portion
20: vehicle light source unit (light source unit)
23: base portion
30: lens
31: optical case portion
33: optical-side fixing portion
34: optical-side sliding portion
36: metal-made supporting main body portion
37: metal-side fixing portion
38: metal-side sliding portion
39: coupling support portion
80: headed screw
81: transversely long through-hole portion
C: optical axis
H: sliding direction
S: supporting direction
X: first perpendicular direction
Y: second perpendicular direction
Y1: one side in the second perpendicular direction
Y2: the other side in the second perpendicular direction
Z: optical axis direction

The invention claimed is:

1. A vehicle light source unit comprising:
a light-emitting portion;
a heat radiation portion that is fixed to the light-emitting portion;
an optical portion that guides light from the light-emitting portion;
an optical supporting portion that supports the optical portion;
a metal-made supporting portion;
a fixing portion that fixes the metal-made supporting portion and the optical supporting portion in a partial and mutual manner; and
a sliding portion that slidably supports the metal-made supporting portion and the optical supporting portion in a partial and mutual manner,
wherein the sliding portion is configured in such a way that the metal-made supporting portion and the optical supporting portion can slide on each other in a predetermined sliding direction and in such a way as to not only support the optical supporting portion against the metal-made supporting portion but also support the metal-made supporting portion against the optical supporting portion, toward one and the other sides of a predetermined supporting direction that is perpendicular to the sliding direction.

2. The vehicle light source unit according to claim 1, wherein the optical supporting portion is made of resin.

3. The vehicle light source unit according to claim 1, wherein the sliding portion is disposed at an end portion of the optical supporting portion.

4. The vehicle light source unit according to claim 1,
wherein one the fixing portion is provided, and
wherein a plurality of the sliding portions are provided.

5. The vehicle light source unit according to claim 1, wherein the sliding direction is substantially parallel to the longitudinal direction of the optical supporting portion.

6. The vehicle light source unit according to claim 1, wherein the metal-made supporting portion is coupled with a base portion by an angle-variable coupling portion that can adjust a mounting angle of the metal-made supporting portion with respect to the base portion.

7. The vehicle light source unit according to claim 1, wherein the sliding direction is substantially perpendicular to the optical axis direction of the optical portion.

8. The vehicle light source unit according to claim 1, wherein the supporting direction is substantially parallel to the optical axis direction of the optical portion.

9. The vehicle light source unit according to claim 1, wherein the sliding portion has a gap in the direction intersecting the sliding direction and is slidable by a distance corresponding to the gap in the direction along which the gap is provided.

10. The vehicle light source unit according to claim 1,
wherein one the fixing portion is provided,
wherein a plurality of the sliding portions are provided and arranged radially around the fixing portion, and
wherein the respective sliding directions of the sliding portions are substantially parallel to the radial direction around the fixing portion.

11. The vehicle light source unit according to claim 1, wherein the light-emitting portion is fixed to the metal-made supporting portion without the intermediary of the optical supporting portion.

12. The vehicle light source unit according to claim 1,
wherein the sliding portion has a sliding groove portion that is groove-shaped and provided at any one of the metal-made supporting portion and the optical supporting portion and a sliding protrusion portion that is protrusion-shaped, provided at the other one of the metal-made supporting portion and the optical supporting portion, and slidably inserted into the sliding groove portion, and
wherein the sliding direction is the extending direction of the sliding groove portion and the supporting direction is the transverse direction of the sliding groove portion.

13. The vehicle light source unit according to claim 1, wherein at the metal-made supporting portion, the sliding portion has a sliding surface that extends in the sliding direction and faces toward one side in the supporting direction and a sliding surface that faces toward the other side in the supporting direction, and at the optical supporting portion, the sliding portion has two sliding surfaces that face the respective sliding surfaces of a member at the metal-made supporting portion.

14. The vehicle light source unit according to claim 1,
wherein the sliding portion has a columnar portion that is columnar and provided at any one of the metal-made supporting portion and the optical supporting portion and a tubular portion that is tubular, provided at the other one of the metal-made supporting portion and the optical supporting portion, and slidably fits with the columnar portion, and wherein the sliding direction is the axle direction of the columnar portion and the supporting direction is the radial direction of the columnar portion.

15. The vehicle light source unit according to claim 1, wherein the sliding portion has a headed screw that is fixed to any one of the metal-made supporting portion and the optical supporting portion and a transversely long through-hole portion that is provided in the other one thereof and whose through-hole through which the headed screw passes is elongated in the transverse direction perpendicular to the penetration direction of the headed screw, and wherein the sliding direction is the transverse direction and the supporting direction is the penetration direction.

16. The vehicle light source unit according to claim 1, wherein the metal-made supporting portion is supported through the intermediary of an elastic member.

17. The vehicle light source unit according to claim 1, wherein the sliding part, at the optical supporting portion, of the sliding portion is made of metal.

18. The vehicle light source unit according to claim 1, wherein the sliding part, at the optical supporting portion, in the sliding portion is a part of a metal portion inserted into and molded with the optical supporting portion made of resin.

19. The vehicle light source unit according to claim 1, wherein the optical portion has a long shape in the horizontal direction, and wherein the sliding direction is substantially parallel to the horizontal direction.

* * * * *